(12) United States Patent
Butler et al.

(10) Patent No.: US 11,582,588 B1
(45) Date of Patent: Feb. 14, 2023

(54) SYSTEMS AND METHODS FOR PROVIDING ROBUST CONNECTIVITY TO VEHICLES

(71) Applicant: RIVIAN IP HOLDINGS, LLC, Irvine, CA (US)

(72) Inventors: Nicholas Butler, Mill Valley, CA (US); Connie W. Yang, Saratoga, CA (US); Vamsi Karteek Devata, Santa Clara, CA (US); Sai Dheeraj Guntupalli, Sunnyvale, CA (US); Srividya Latha Gogulapati, San Jose, CA (US); Robert Francis, Menlo Park, CA (US); Jon Boeing, San Diego, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 0 days.

(21) Appl. No.: 17/733,854

(22) Filed: Apr. 29, 2022

Related U.S. Application Data

(60) Provisional application No. 63/291,878, filed on Dec. 20, 2021.

(51) Int. Cl.
  *H04W 4/18* (2009.01)
  *H04W 8/20* (2009.01)
  *H04W 88/06* (2009.01)

(52) U.S. Cl.
  CPC .............. *H04W 4/18* (2013.01); *H04W 8/205* (2013.01); *H04W 88/06* (2013.01)

(58) Field of Classification Search
  CPC ........ H04W 4/18; H04W 8/205; H04W 88/06
  See application file for complete search history.

(56) References Cited

U.S. PATENT DOCUMENTS

| | | | |
|---|---|---|---|
| 9,674,880 B1* | 6/2017 | Egner | A61B 5/14542 |
| 9,747,626 B2* | 8/2017 | Gormley | G07C 5/008 |
| 9,775,562 B2* | 10/2017 | Egner | A61B 5/14503 |
| 10,332,327 B2* | 6/2019 | Link, II | G06F 21/35 |
| 10,600,265 B2* | 3/2020 | Link, II | G06F 21/35 |
| 11,395,370 B1* | 7/2022 | Statezni | H01Q 1/521 |
| 2011/0286437 A1 | 11/2011 | Austin et al. | |
| 2012/0108204 A1 | 5/2012 | Schell et al. | |
| 2015/0026312 A1 | 1/2015 | Othmer et al. | |
| 2016/0150451 A1 | 5/2016 | Barreto et al. | |
| 2017/0196026 A1* | 7/2017 | Daoud | H04W 4/16 |

OTHER PUBLICATIONS

U.S. Appl. No. 17/733,859, filed Apr. 29, 2022, Nicholas Butler.

* cited by examiner

*Primary Examiner* — Julio R Perez
(74) *Attorney, Agent, or Firm* — Haley Guiliano LLP

(57) ABSTRACT

Systems and methods are provided to manage, control, and configure connectivity for vehicles or other devices. Data in different formats, which is received from different connectivity providers, is converted into a unified data format and stored in a data store. The unified data format allows analytics to be performed across the converted data. In some embodiments, a connectivity type of a plurality of connectivity types associated with a vehicle is controlled based on a current lifecycle stage of the vehicle. In some embodiments, a first data connection between a device and a first connectivity provider is utilized. Based on an identified change in location of the device and information associated with a second data connection between the device and a second connectivity provider, a switch to the second data connection is facilitated based on a determination that that the second data connection has more optimal characteristics.

20 Claims, 23 Drawing Sheets

SYSTEMS AND METHODS FOR PROVIDING ROBUST CONNECTIVITY TO VEHICLES

CROSS-REFERENCE TO RELATED APPLICATION

This application claims priority to U.S. Provisional Patent Application No. 63/291,878, filed on Dec. 20, 2021, the entire contents of which are hereby expressly incorporated by reference herein in their entirety.

INTRODUCTION

Reliable and robust vehicle connectivity is increasingly important for both consumer and commercial vehicles and vehicle fleets. For example, connected vehicles may require connectivity to provide features such as over-the-air (OTA) updates, advanced driver assistance systems (ADAS), telematics, vehicle control, etc. Many traditional vehicle original equipment manufacturers (OEMs) or fleet managers rely on a single cellular carrier (e.g., per region or country) to provide cellular coverage to all vehicles. However, reliance on a single cellular carrier often does not allow vehicles to take advantage of other available cellular carriers or other wireless networks that may offer improved service range, more consistent connectivity, faster download/upload speed, cheaper rates, etc. Additionally, reliance on a single cellular carrier may offer very little insight into and control of connectivity for a vehicle OEM's national or global fleet.

SUMMARY

It is advantageous to provide systems and methods that enable multi-cellular and multi-access connectivity to vehicles (or a fleet of vehicles), thereby allowing robust connectivity that can adapt in real time to vehicles' environments. For example, vehicles may be provided with an embedded subscriber identity module (eSIM) card in their respective hardware, which allows each of the plurality of vehicles to be reprogrammed, via software, to swap cellular carriers based on cost and coverage of the available cellular carriers (e.g., at each vehicle's geographical location). Additionally, a connectivity management platform (CMP) that supports multiple connectivity types (e.g., cellular, private cellular, Wi-Fi, satellite, open roaming, etc.) may be provided to monitor and control vehicle connectivity, as well as connectivity of any other IoT devices included in the system (e.g., peripherals, accessories, charging stations, etc.).

Although a CMP for managing a vehicle fleet and other devices associated with a vehicle fleet (e.g., charging stations) is discussed, it should be understood that the functionality of the CMP discussed herein may be extended to any IoT platform to manage connectivity for a group of IoT devices (e.g., smart doorbells, tablets, energy systems, etc.).

To solve one or more of these problems, systems and methods are provided to manage, control, and configure connectivity for devices (e.g., vehicles or other devices). In some embodiments, a connectivity management method is provided. The method includes: receiving, from a first connectivity provider, first data in a first data format; receiving, from a second connectivity provider, second data in a second data format different from the first data format; converting, using control circuitry, the first data and the second data into a unified data format. The unified data format allows analytics to be performed across the converted first data and the converted second data; and storing, in a data store, each of the converted first data and the converted second data in the unified data format.

In some embodiments, converting the first data and the second data into the unified data format may include converting the first data into the unified data format using a first application programming interface (API), and converting the second data into the unified data format using a second API.

In some embodiments, the method may further include receiving, from a device capable of connecting to each of the first connectivity provider and the second connectivity provider, third data in a third data format, converting the third data into the unified data format, and storing, in the data store, the converted third data in the unified data format.

In some embodiments, the first data may include one or more of available plans and settings of the first connectivity provider, first data usage by the device, or a current connection state of the device to the first connectivity provider. In some embodiments, the second data may include one or more of available plans and settings of the second connectivity provider, second data usage by the device, or a current connection state of the device to the second connectivity provider. In some embodiments, the third data may include one or more of third data usage by the device, eSIM profiles currently loaded onto an eSIM of the device, or location information of the device.

In some embodiments, the device may include a plurality of devices and the third data may include data of each of the plurality of devices.

In some embodiments, the method may further include aggregating and analyzing data of the converted first data, the converted second data, and the converted third data to identify at least one of connectivity usage and cost across the plurality of devices, a current connectivity state of each of the plurality of devices, or abnormal data usage of one of the plurality of devices.

In some embodiments, the plurality of devices may include a plurality of vehicles.

In some embodiments, the device may include a plurality of vehicles and the third data may include data of each of the plurality of vehicles. In some embodiments, storing, in the data store, each of the converted first data, the converted second data, and the converted third data in the unified data format may include, for each of the plurality of vehicles: determining data of the converted first data, the converted second data, and the converted third data associated with the vehicle; and storing the determined data in association with an identifier of the vehicle.

In some embodiments, the identifier of the vehicle is a vehicle identification number (VIN).

In some embodiments, the first connectivity provider is a first mobile network operator (MNO) and the second connectivity provider is a second MNO.

In some embodiments, a system is provided. The system includes a memory storing instructions, and control circuitry configured to execute the instructions stored in the memory to: receive, from a first connectivity provider, first data in a first data format; receive, from a second connectivity provider, second data in a second data format different from the first data format; convert the first data and the second data into a unified data format. The unified data format allows analytics to be performed across the converted first data and the converted second data; and store, in the data store, each of the converted first data and the converted second data in the unified data format.

In some embodiments, a non-transitory computer-readable medium is provided. The non-transitory computer-readable medium includes non-transitory computer-readable instructions encoded thereon that, when executed by control circuitry, causes the control circuitry to: receive, from a first connectivity provider, first data in a first data format; receive, from a second connectivity provider, second data in a second data format different from the first data format; convert the first data and the second data into a unified data format. The unified data format allows analytics to be performed across the converted first data and the converted second data; and store, in data store, each of the converted first data and the converted second data in the unified data format.

In some embodiments, a method for controlling connectivity of a vehicle is provided. The method includes determining, using control circuitry, a current lifecycle stage in a lifecycle of the vehicle, and controlling, using the control circuitry, a connectivity type of a plurality of connectivity types associated with the vehicle based on the current lifecycle stage.

In some embodiments, the current lifecycle stage may be one of: a parts stage when parts of the vehicle are being manufactured, a factory stage when the vehicle is being assembled, a delivery stage when the vehicle is being delivered to a customer or point of sale, a purchased stage when the customer takes possession of the vehicle, a resale stage when the vehicle is being resold to a second customer, a repurchased stage when the second customer takes possession of the vehicle, a maintenance stage when maintenance is being performed on the vehicle, or an end-of-life stage of the vehicle.

In some embodiments, controlling the connectivity type of the vehicle may include enabling or disabling one or more of the plurality of connectivity types based on the current lifecycle stage. The plurality of connectivity types may include a cellular connectivity, Wi-Fi connectivity, satellite connectivity, or near-field-communication (NFC) connectivity.

In some embodiments, controlling the connectivity type of the vehicle may include provisioning or removing a profile from an eSIM of the vehicle, or enabling or disabling a current profile on the eSIM.

In some embodiments, controlling the connectivity type of the vehicle may be further based on a current location of the vehicle.

In some embodiments, determining the current lifecycle stage may include receiving information from a telematics control module (TCM) of the vehicle.

In some embodiments, the method may further include determining, in response to determining that the current lifecycle stage is a factory stage, whether mapping of an eSIM to a VIN of the vehicle is complete, and enabling, in response to determining that the mapping of the eSIM to the VIN of the vehicle is complete, cellular connectivity and Wi-Fi connectivity of the vehicle.

In some embodiments, the method may further include, enabling, in response to determining that the current lifecycle stage is a delivery stage, cellular connectivity and disabling the Wi-Fi connectivity of the vehicle.

In some embodiments, the method may further include enabling, in response to determining that the current lifecycle stage is a purchased stage, cellular connectivity and Wi-Fi connectivity of the vehicle, and activating a cellular hotspot capability of the vehicle.

In some embodiments, the method may further include disabling, in response to determining that the current lifecycle stage is an end-of-life stage, all of the plurality of connectivity types associated with the vehicle.

In some embodiments, a system is provided. The system includes a memory storing instructions, and control circuitry configured to execute the instructions stored in the memory to determine a current lifecycle stage in a lifecycle of a vehicle, and control a connectivity type of a plurality of In some embodiments, a non-transitory computer-readable medium is provided. The non-transitory computer-readable medium includes instructions encoded thereon that, when executed by control circuitry, cause the control circuitry to determine a current lifecycle stage in a lifecycle of a vehicle, and control a connectivity type of the vehicle based on the current lifecycle stage.

In some embodiments, a connectivity configuration method for a device is provided. The method includes utilizing a first data connection of a communication type between the device and a first connectivity provider and identifying a change in location of the device. The method further includes determining, based on the identified change in location and information associated with a second data connection of the communication type between the device and a second connectivity provider, that the second data connection has more optimal characteristics over the first data connection, which is available at the changed location, and facilitating a switch from the first data connection to the second data connection based on the change in the location.

In some embodiments, the communication type may be cellular or satellite.

In some embodiments, the first connectivity provider may be a first cellular provider and the second connectivity provider may be a second cellular provider different from the first cellular provider. In some embodiments, facilitating the switch from the first data connection to the second data connection may include: downloading to the device, by the first data connection provided by the first cellular provider, a profile associated with the second cellular provider; provisioning an eSIM of the device with the profile associated with the second cellular provider; enabling, on the eSIM, the profile associated with the second cellular provider; and disabling, on the eSIM, a profile associated with the first cellular provider.

In some embodiments, determining that the second data connection has more optimal characteristics over the first data connection may include evaluating cellular performance of the first data connection and the second data connection at the changed location, and determining the cellular performance of the second cellular provider is better than the cellular performance of the first data provider at the changed location, based on a result of the evaluating.

In some embodiments, the second connectivity provider may be a cellular provider. In some embodiments, the method may further include facilitating a switch from the second data connection to a third data connection between the device and a Wi-Fi provider by: downloading to the device, by second data connection provided by the cellular provider, connection information for connecting to the Wi-Fi provider; and connecting, by the device, to the Wi-Fi provider with the connection information.

In some embodiments, determining that the second data connection has more optimal characteristics over the first data connection may be based on the cost of the first data connection and the second data connection at the changed location.

In some embodiments, the device may be a vehicle.

In some embodiments, the device may be a first vehicle in a fleet of vehicles, and the method may further include: receiving, from the first connectivity provider, a first data usage amount by the first vehicle; determining that the data usage has exceeded a threshold amount of data; in response to determining that the data usage has exceeded the threshold amount of data, identifying a third connectivity provider; generating instructions to facilitate the switch of the first vehicle from the first data connection provided by the first connectivity provider to the third data connection provided by the third connectivity provider; and transmitting, by the first connectivity provider, the one or more instructions to the first vehicle.

In some embodiments, a connectivity configuration method for a device is provided. The method includes identifying a location of the device; identifying a preferred connectivity provider among a plurality of connectivity providers based on the location of the device and historical information associated with the plurality of connectivity providers; and facilitating a connection to the preferred connectivity provider by providing a profile or connection information required for communicating with the preferred connectivity provider.

In some embodiments, a connectivity configuration system is provided. The system includes a memory storing instructions, and control circuitry configured to execute the instructions stored in the memory to: utilize a first data connection of a communication type between the device and a first connectivity provider; identify a change in location of the device; determine, based on the identified change in location and information associated with a second data connection of the communication type between the device and a second connectivity provider, that the second data connection has more optimal characteristics over the first data connection, which is available at the changed location; and facilitate a switch from the first data connection to the second data connection based on the change in the location.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
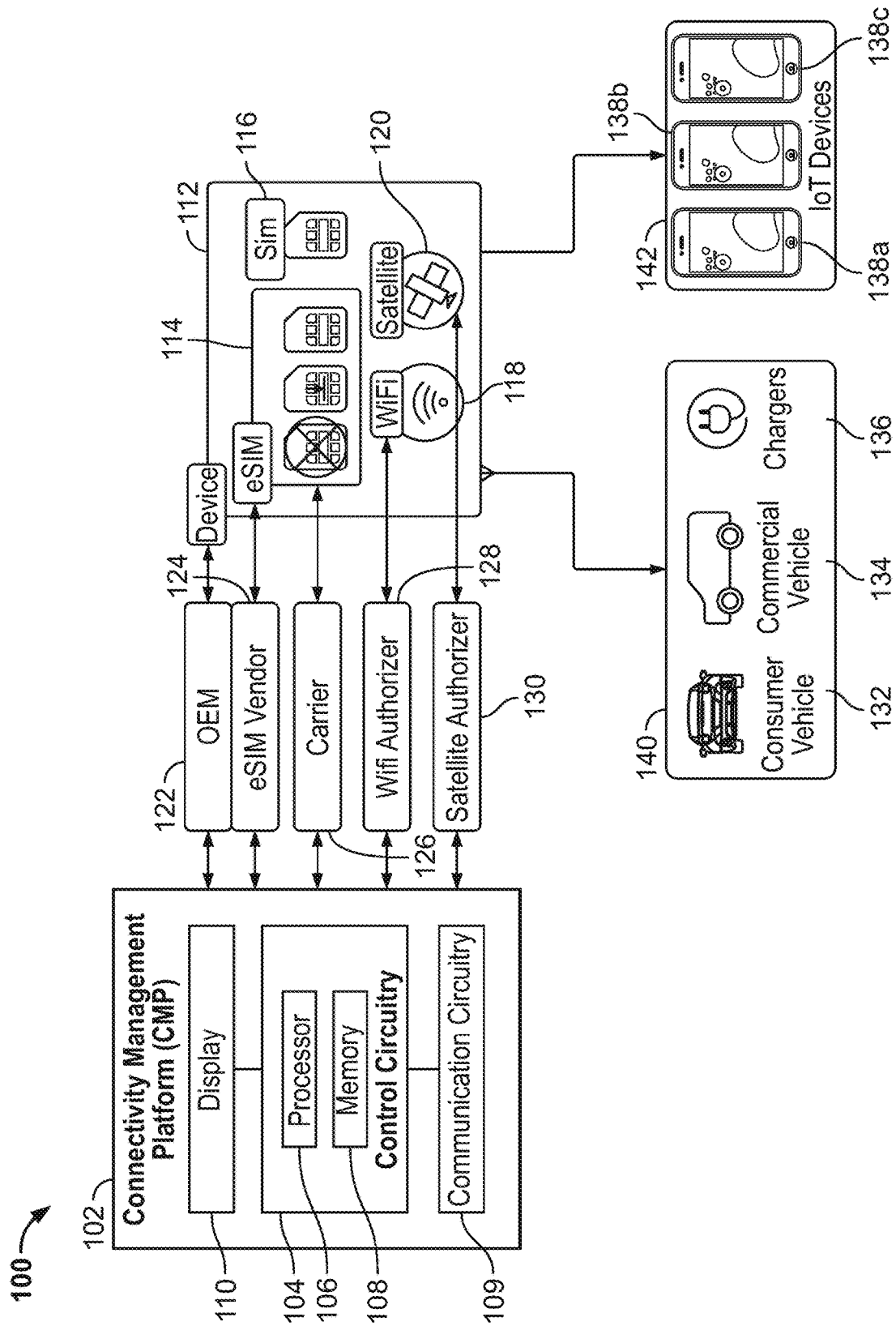
FIG. 1 depicts an exemplary system architecture, in accordance with some embodiments of the present disclosure.

It would be advantageous to provide a centralized system (e.g., a CMP) that is able to monitor and control connectivity across all connected devices (e.g., vehicles, charging stations, peripherals, accessors, etc.) and connectivity carriers in a system (e.g., a single pane of glass). However, due to the different data structures and formats across connected devices and connectivity carriers, it may be difficult to combine and aggregate data and manage connectivity for the connected devices. For example, different connectivity carriers (e.g., cellular carriers, Wi-Fi providers, satellite providers, ISPs) may use different APIs and different data formats to collect, store, and communicate data (and commands). Similarly, different devices may use different data formats, different data structures, different identifiers, different identification to SIM mappings, etc. According to one example, a CMP (e.g., as shown in FIG. 1) includes a unified data model and adapter layer, as shown in greater detail in, e.g., FIG. 2. The adapter layer may act as a translation layer to communicate with a plurality of networks and devices. For example, the adapter layer may include a plurality of adapters that link with each device or connectivity carrier and map and convert data or commands from those sources into a unified data format, as explained in further detail below with reference to FIGS. 2, 7, and 8. By converting data into a unified data format, data can be aggregated and analyzed to monitor connectivity across the entire system and develop insights for optimizing connectivity (e.g., the unified data format allows analytics to be performed across the converted data by applying common rules and functions), minimizing costs (e.g., in real or near-real time), identifying connectivity issues, enabling communication with a plurality of different connectivity providers (e.g., using different formats), etc. wherein the unified data format allows analytics to be performed across the converted first data and the converted second data; and In some embodiments, in order to monitor and control the connectivity of each connected vehicle, each vehicle's vehicle identification number (VIN) or other identifying information may be mapped to the vehicle's eSIM, Wi-Fi, and any other connection modules of the vehicle. For example, during telematics control module (TCM) (or telematic control unit TCU) flashing (e.g., during the manufacture of the vehicle), the embedded identify document (EID)/integrated circuit card identifier (ICCID)/international mobile station equipment identity (IMEI) may be mapped to a particular VIN and saved in the system. If connectivity attributes change during the lifetime of the vehicle (e.g., additional cellular carrier profiles are added to the eSIM), these changes may be associated with the VIN and tracked by the system (e.g., which is an identifier of the vehicle that is constant throughout the vehicle's life cycle). Accordingly, all connectivity for each connected vehicle may be easily monitored and controlled on both an aggregated and VIN level.

In some embodiments, the CMP may track connectivity usage and cost across all devices spanning all supported carriers and connectivity types. Thus, for example, the amount of data being consumed by each vehicle across different connectivity types may be monitored and aggregated. By aggregating connectivity data and costs, the CMP may develop insights based on geographic locations, vehicle attributes, connectivity types, connection time (e.g., peak/off-peak), cost, etc., that may be used to optimize connectivity and minimize cost. For example, the CMP may provide recommendations of what connectivity carriers should be active based on the current location of a vehicle. In some embodiments, the CMP may leverage a machine learning model such as a neural network, e.g., a convolutional neural network (CNN), or any other suitable machine learning model trained to accept as input data relating to usage, connectivity, and carriers. The CMP may output various connectivity recommendations for optimizing connectivity for the vehicle based on location, vehicle attributes, historical delivery routing data, connection timing (peak/off-peak), etc. In some embodiments, the CMP may monitor service and network outage bulletins from connectivity carriers to provide recommendations. In some embodiments, the CMP may facilitate changes to the rate plan roaming configurations, eSIM states, and activate/de-activate connectivity services remotely. For example, the CMP may generate a command (or recommendation) in the unified data format and transmit the command to a vehicle over the vehicle's current connectivity provider after converting the command into the data format of the connectivity provider and/or vehicle (e.g., by using a converter or adapter to translate the generated command to a specific format for a vendor-specific command).

In some embodiments, the CMP implements comprehensive over-the-air testing and device management with the plurality of devices to consider antenna and receiver performance of the plurality of devices. For example, a commercial vehicle (e.g., a delivery van) may have poor antenna performance and, consequently, experience poor connectivity, in which case the connectivity management platform would identify the commercial vehicle among a fleet of vehicles and recommend it be brought in for service. In some embodiments, the plurality of devices may each incorporate an eSIM card in their respective hardware, which allows each of the plurality of devices to be reprogrammed, via software, to connect to a respective carrier. For example, a connected vehicle currently connected to a first carrier may be entering a region where the first carrier has a poor connection, in which case the CMP may recommend or facilitate a switch to a second carrier, based on aggregated coverage information (e.g., data analytics and rendered carrier statistics).

It should be understood that the eSIM may not be specific to any one of the plurality of devices. In some embodiments, the eSIM may have multiple profiles, and each profile may be associated with a respective cellular carrier. The CMP may collect and fetch information (e.g., cloud data) of individual or bulk devices/connections to preemptively switch, or recommend to switch, carriers in the plurality of devices. For example, the CMP may recommend or facilitate a carrier or connectivity switch based on the location of the vehicle (e.g., by geofencing around an area of poor service or expensive roaming) and cause the eSIM profile of the vehicle to change dynamically.

In some embodiments, the CMP may need an indication, trigger, or switch from cloud data services to alert the CMP of when to switch carriers. Reasons for switching carriers may include high cost due to high data usage, lack of coverage by a carrier, location of a connected device, a client's request to connect their fleet of vehicles to a specific carrier, etc. In some embodiments, the CMP may incorporate time-based carrier switching based on peak usage times by users. For example, the connectivity management program may recommend a better-suited carrier, or data plan, to a user if the user consistently uses their connected vehicle as a hotspot during specific times of the day and accordingly burns through their data usage plan.

In some embodiments, the CMP may include an eSIM management platform, which may track the eSIM lifecycle in the plurality of devices. For example, the eSIM management platform may create a default eSIM profile, coupled to a first carrier (e.g., the manufacturer's private cellular network or global core network), when a connected vehicle is manufactured. When the connected vehicle is sold and shipped to a customer, the vehicle may automatically connect to a second carrier prevalent in the customer's region using an associated eSIM profile. This connectivity spans the entire life cycle process of the eSIM. In some embodiments, the CMP may utilize a common application programming interface (API), integrated across all components of the connectivity management platform, to perform bulk operations (e.g., execute/schedule mass software updates with the plurality of devices), track connectivity signal strengths and usages, diagnose and debug issues, or search/filter devices or connections based on their characteristics (e.g., location, type of device, data usage, type of carrier, etc.). In some embodiments, the application programming interface may enable the CMP to be deployed in different third-party developers. In some embodiments, the CMP may use the API to process connection, process historical data, disable components that may not be needed, or pause a data flow for a desired event with a time out. In some embodiments, the CMP may retry failed API calls.

In some embodiments, the plurality of devices may have any suitable number of connectivity methods. In some embodiments, the CMP may prioritize a first network (e.g., Wi-Fi) over a second network (e.g., cellular). It will be understood that the CMP may prioritize networks based on user preferences or user data plans. For example, in order to mitigate the cost of connecting a vehicle to a carrier, a user may set a preference for their connected vehicle to look to couple to a Wi-Fi network before coupling to a cellular network. In some embodiments, the CMP may implement open roaming to connect the plurality of devices to trusted Wi-Fi networks.

In some embodiments, the CMP may couple a connected device to a respective network (e.g., Wi-Fi, cellular, satellite, open roaming, etc.) based on the location of the connected device. For example, in the instance a connected vehicle is manufactured and shipped to a customer, the CMP may couple the connected vehicle to the manufacturer's Wi-Fi network or private cellular network while located in the factory, may couple the connected vehicle to a cellular network while being transported to a cargo ship, and may couple the connected vehicle to a satellite while on the cargo ship, all of which contributes to the eSIM life cycle makeup in the connected vehicle.

Further details of the CMP, eSIM, and associated systems and functions are described below with reference to the attached figures.

FIG. 1 depicts an exemplary system architecture 100, in accordance with some embodiments of the present disclosure. As shown, the exemplary network architecture 100 includes a CMP 102. In some embodiments, the CMP 102 may manage connectivity for a plurality of devices 112 in a plurality of systems 140 and 142 (e.g., electric vehicle system 140 and IoT device system 142). However, this is only an example, and a dedicated CMP may be implemented for each of the plurality of systems 140 and 142. Additionally, although two systems are shown as being managed by a single CMP, it should be understood that the CMP 102 may be used for a single system or two or more systems. The CMP 102 may include control circuitry 104 (e.g., including a processor 106 and memory 108) and communication circuitry 109. The processor 106 may comprise a hardware processor, a software processor (e.g., a processor emulated using a virtual machine), or any combination thereof. In some embodiments, the processor 106 and memory 108 in combination may be referred to as the control circuitry 104. In some embodiments, the processor 106 alone may be referred to as the control circuitry 106. The memory 108 may comprise hardware elements for non-transitory storage of commands or instructions, that, when executed by the processor 106, cause the processor 106 to act in accordance with embodiments described above and below. As referred to herein, the control circuitry 104 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, the control circuitry 104 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the CMP 102 may be implemented by one or more servers. In some embodiments, the CMP 102 may also include a display 110. A SIM card may refer to a microchip card, or an embedded SIM (eSIM) on a chip, inserted into a terminal, used to identify a device across mobile networks. This may be a SIM, micro SIM, uSIM, iSIM, or any other type of SIM card or SIM on a chip (e.g., integrated circuit component. Additionally, the functions and architecture described below may be implemented by the system of FIG. 1, or by any of the other systems illustrated in the attached figures or described in greater detail below.

As shown, each of the devices 112 may incorporate an eSIM card 114, a SIM card 116, a Wi-Fi module 118, and a satellite module 120. In some embodiments, each of the devices 112 is managed by a respective original equipment manufacturer 122 (OEM) and each of the eSIMs is managed or sold by a respective eSIM vendor 124. Carrier 126 may be one of a plurality of carriers that provide cellular connectivity to each of the devices 112 through the eSIM card 114 (or through the SIM card 116). Wi-Fi authorizer 128 may be one of a plurality of Wi-Fi authorizers that provides Wi-Fi connectivity to each of the devices 112 through the Wi-Fi module 118. Satellite authorizer 130 may be one of a plurality of satellite authorizers that provide satellite connectivity to each of the devices 112 through the satellite module 120. As explained in further detail below, the CMP 102 may couple the eSIM card of each of the plurality of devices 112 to, for example, a cellular carrier to provide connectivity to the plurality of devices. In some embodiments, the CMP may couple the eSIM card of the plurality of devices to a Wi-Fi network or satellite in order to provide connectivity. As shown, the system 140 may include, e.g., a consumer vehicle 132, a commercial vehicle 134, and chargers 136, while the system 142 may include, e.g., a plurality of IoT devices 138a-138c.

Figure 2:
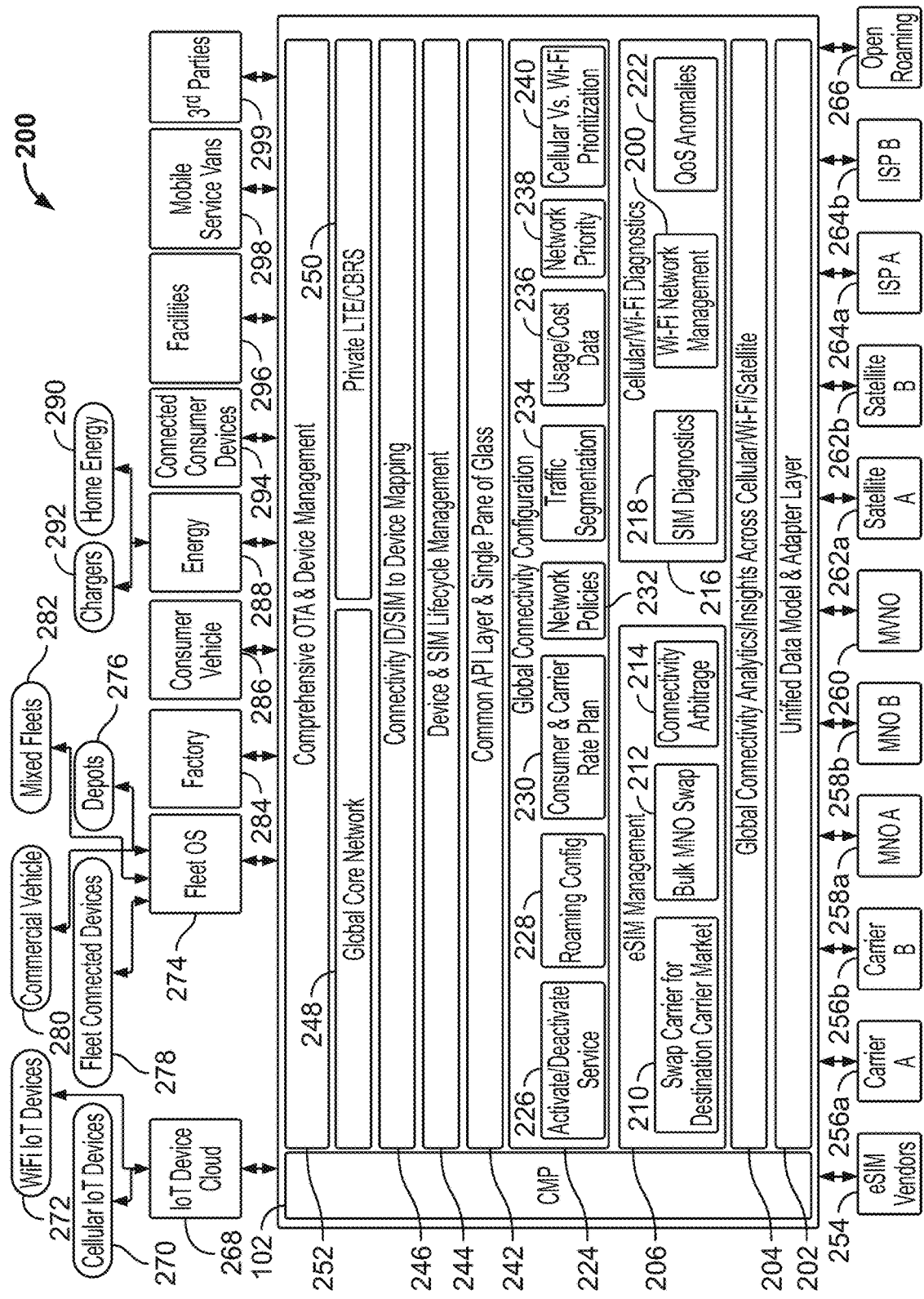
FIG. 2 depicts an exemplary architecture including the CMP, in accordance with some embodiments of the present disclosure.

FIG. 2 depicts an exemplary architecture 200 including the CMP 102, in accordance with some embodiments of the present disclosure. The architecture shown in FIG. 2 may be implemented to provide and manage connectivity to a plurality of devices and systems (e.g., IoT device cloud 268, a fleet operating system (OS) 274, a factory 284 (e.g., a vehicle factory), a consumer vehicle 286, an energy system 288, connected consumer devices 294, facilities 296 (e.g., service centers, retail, etc.), mobile service vans 298, third parties 299 (e.g., device providers that require data to provision services), via a plurality of networks and network providers (e.g., cellular, private cellular, Wi-Fi, satellite, open roaming, etc.). The IoT device cloud 268 may include, e.g., cellular IoT devices 270 and Wi-Fi IoT devices 272. The fleet OS 274 may include, e.g., depots 276, fleet connected devices 278, commercial vehicle 280, and mixed fleets 282. The energy system 288 may include, e.g., home energy systems 290 and chargers 292. The plurality of networks and network providers may include eSIM vendors 254, a plurality of carriers 256a, 256b, a plurality of mobile network operators (MNOs) 258a, 258b, a mobile virtual network operator (MVNO) 260, a plurality of satellite providers 262a, 262b, a plurality of internet service provides 264a, 264b, and open roaming provider 266.

As shown, the CMP 102 may implement a unified data model and adapter layer 202, a global connectivity analytics/insights module 204, an eSIM management module 206, a cellular/Wi-Fi diagnostics module 216, a global connectivity configuration module 224, a common API layer and single pane of glass module 242, a device and SIM (eSIM) lifecycle management module 244, and a connectivity ID/SIM to device mapping module 246. As explained in further detail below, the single pane of glass module 242 may present data from multiple sources shown in FIG. 2 (e.g., network providers, devices, etc.) on a unified display (e.g., to allow the operator of a group of devices to easily optimize, control, and monitor connectivity across the group of devices). The modules/layers may be implemented by software, hardware, or any combination thereof and may perform the functions described herein.

As shown, the eSIM management module 206 may include a swap carrier for destination carrier market module 210, a bulk MNO swap module 212, and a connectivity arbitrage module 214.

As shown, the cellular/Wi-Fi diagnostics module 216 may include a SIM diagnostics module 218, a Wi-Fi network management module 220, and a QoS anomalies module 222.

As shown, the global connectivity configuration module 224 may include a activate/de-activate service module 226, a roaming configuration module 228, a consumer and carrier rate plan module 230, a network policies module 232, a traffic segmentation module 234, a usage/cost data module 236, a network priority module 238, and a cellular vs. Wi-Fi prioritization module 240.

As shown, the CMP 102 may implement a global core network 248, a private Long Term Evolution (LTE)/Citizens Broadband Radio Service (CBRS) module 250, and a comprehensive OTA (over the air) and device management module 252. In some embodiments, the CMP 102 may implement a private mesh/distributed network with a plurality of devices (e.g., with vehicle broadcast connectivity).

In some embodiments, the CMP 102 may have a modular architecture. Thus, for example, depending on where the CMP 102 is used (e.g., the United States, Europe, etc.) or the particular application that the CMP 102 is used for, different region-specific adapters or modules may be deployed.

Figure 3:
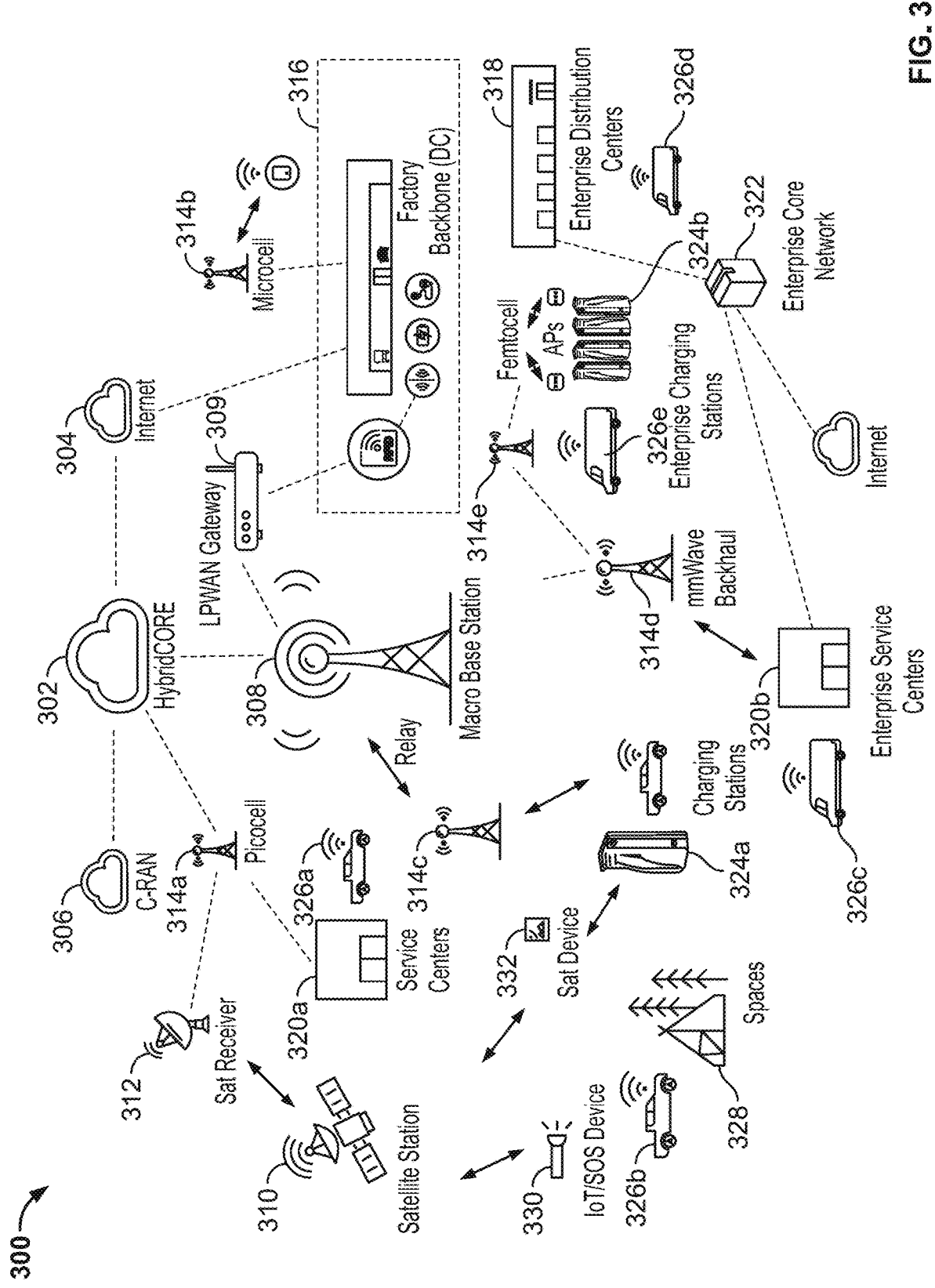
FIG. 3 depicts an exemplary network infrastructure, in accordance with some embodiments of the present disclosure.

FIG. 3 depicts an exemplary network infrastructure 300, in accordance with some embodiments of the present disclosure. FIG. 3 provides a visual overview of how a CMP (e.g., the CMP 102), via a macro base station 308, communicates to a plurality of devices (e.g., consumer vehicles 326a, 326b; commercial vehicles 326c, 326d, 326e; charging stations 324a, 324b; IoT device 330; satellite (SAT) device 332 etc.) to provide/manage connectivity. For example, the CMP may communicate with the plurality of devices via HybridCORE 302, internet 304, centralized-RAN (C-RAN) 306, low-power wide-area network (LP-WAN) gateway 309, satellite station 310, sat receiver 312, enterprise core network 322, factory backbone 316, enterprise distribution center 318, service centers 320a, 320b, spaces 328, etc. As shown, FIG. 3 may include a variety of networks (e.g., cellular, private cellular, Wi-Fi, satellite, etc.), which provide connectivity to the plurality of devices by coupling to their respective eSIM cards. In some embodiments, in areas of low coverage, it may be advantageous to provide private cellular networks at the charging stations 324a, 324b. Although various types of networks and network devices are illustrated, it should be understood that the network infrastructure 300 may include any suitable networks and network devices for providing and managing connectivity to a plurality of devices.

Figure 4:
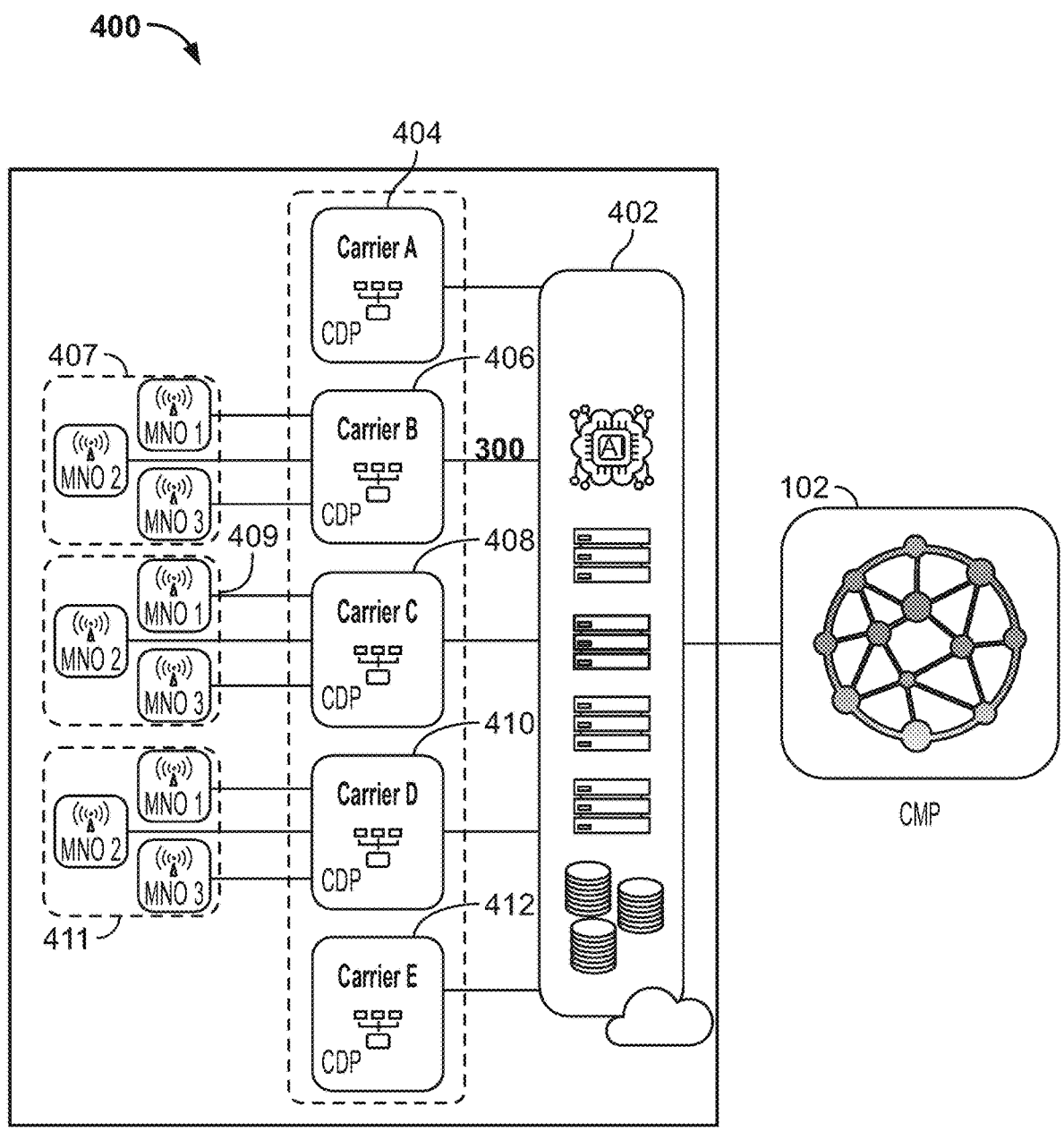
FIG. 4 depicts an exemplary connectivity platform, in accordance with some embodiments of the present disclosure.

FIG. 4 depicts an exemplary connectivity platform 400, in accordance with some embodiments of the present disclosure. FIG. 4 includes a plurality of carriers 404, 406, 408, 410, and 412 that each adhere to a cisco discovery protocol (CDP), which, in some embodiments, may use on-demand routing to include routing information in CDP announcements throughout the network. However, this is only one example, and the plurality of carriers 404-412 may adhere to any data link layer protocol to transfer data between nodes. As shown, each of carrier B 406, carrier C 408, and carrier D 410 may include respective mobile network operators (MNOs) 407, 409, and 411 to provide wireless connectivity to a plurality of devices coupled to the CMP 102 (e.g., through cloud services 402). It will be understood that any suitable number of the carriers in FIG. 4 may include any suitable number of MNOs.

Figure 5:
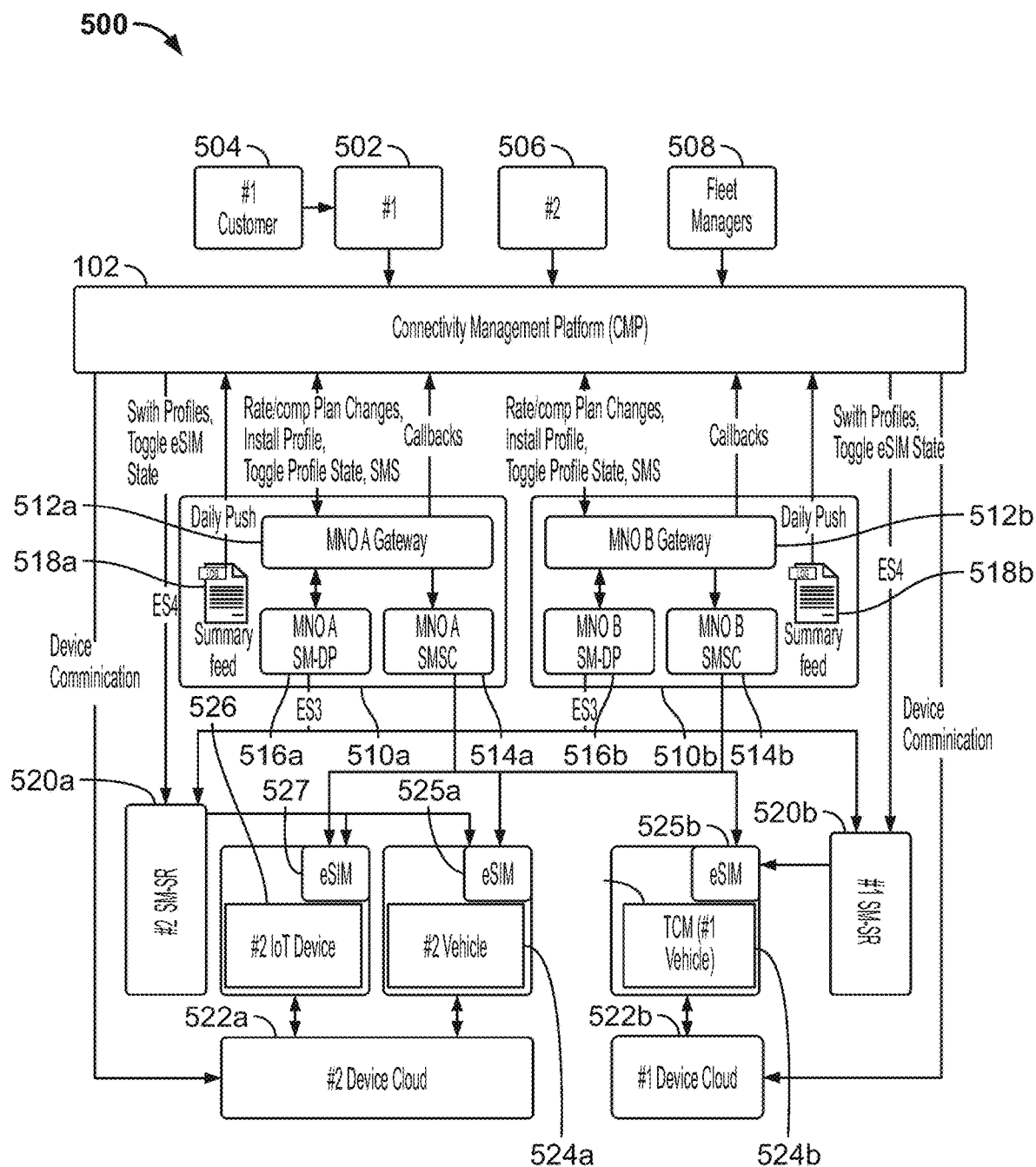
FIG. 5 depicts an exemplary framework for managing connectivity of devices in a plurality of systems with a shared CMP, in accordance with some embodiments of the present disclosure.

FIG. 5 depicts an exemplary framework 500 for managing connectivity of devices in a plurality of systems (e.g., system #1 502 and system #2 506) with a shared CMP 102, in accordance with some embodiments of the present disclosure. In some embodiments, the CMP 102 may be managed by one of the systems (e.g., system #1 502) and provided to the other one of the systems (e.g., system #2 506). Additionally, certain functionalities of the CMP 102 may be provided to other related systems (e.g., customer #1 504 and fleet managers 508).

As shown, system #1 502 may include a first subscription-manager secure routing (SM-SR) 520b, a first vehicle 524b, and a first device cloud 522b. The SM-SR 520b may securely deliver encrypted operator credentials to eSIM 525b of vehicle 524b. As shown, the first vehicle 524b may include a TCM. As shown, system #2 506 may include a second SM-SR 520a, an IoT device 526, a second vehicle 524a, and a second device cloud 522a. The SM-SR 520a may securely deliver encrypted operator credentials to eSIM 527 of the IoT device 526 and to eSIM 525a of the second vehicle 524a. Although only a single type of each device for each of the systems 502 and 506 is shown, it should be understood that each system may include a plurality of eSIM-enabled devices (e.g., IoT devices, vehicles, etc.).

As shown, the plurality of devices of each of the systems 502 and 506 may include a plurality of communications paths to the respective device clouds (522a, 522b) and to the CMP 102 (e.g., through first MNO A 510a and second MNO B 510b). As shown, the first MNO A 510a may include MNO A gateway 512a, MNO A short message service center (SMSC) 514a, and MNO A subscription manager data preparation (SM-DP) 516a, while the second MNO B 510b may include MNO B gateway 512b, MNO B SMSC 514b, and MNO B SM-DP 516b. The CMP 102 may transmit and receive a variety of data to the plurality of devices of each of the systems 502 and 506 (e.g., API calls to switch profiles and toggle eSIM states; rate/comp plan charges information, install profile commands, toggle profile commands, callbacks, daily or periodic summary information feeds, etc.). However, this is only an example, and the CMP 102 may transmit and receive any suitable information for managing connectivity of the devices of the systems 502 and 506. For example, the CMP 102 may receive daily summary feeds 518a and 518b.

In some embodiments, the cloud storage may be periodically connected to the CMP through certain low-cost connections (e.g., Wi-Fi) when available. In some embodiments, the CMP may prioritize different data streams and different times, depending on the available connectivity methods.

Figure 6A:
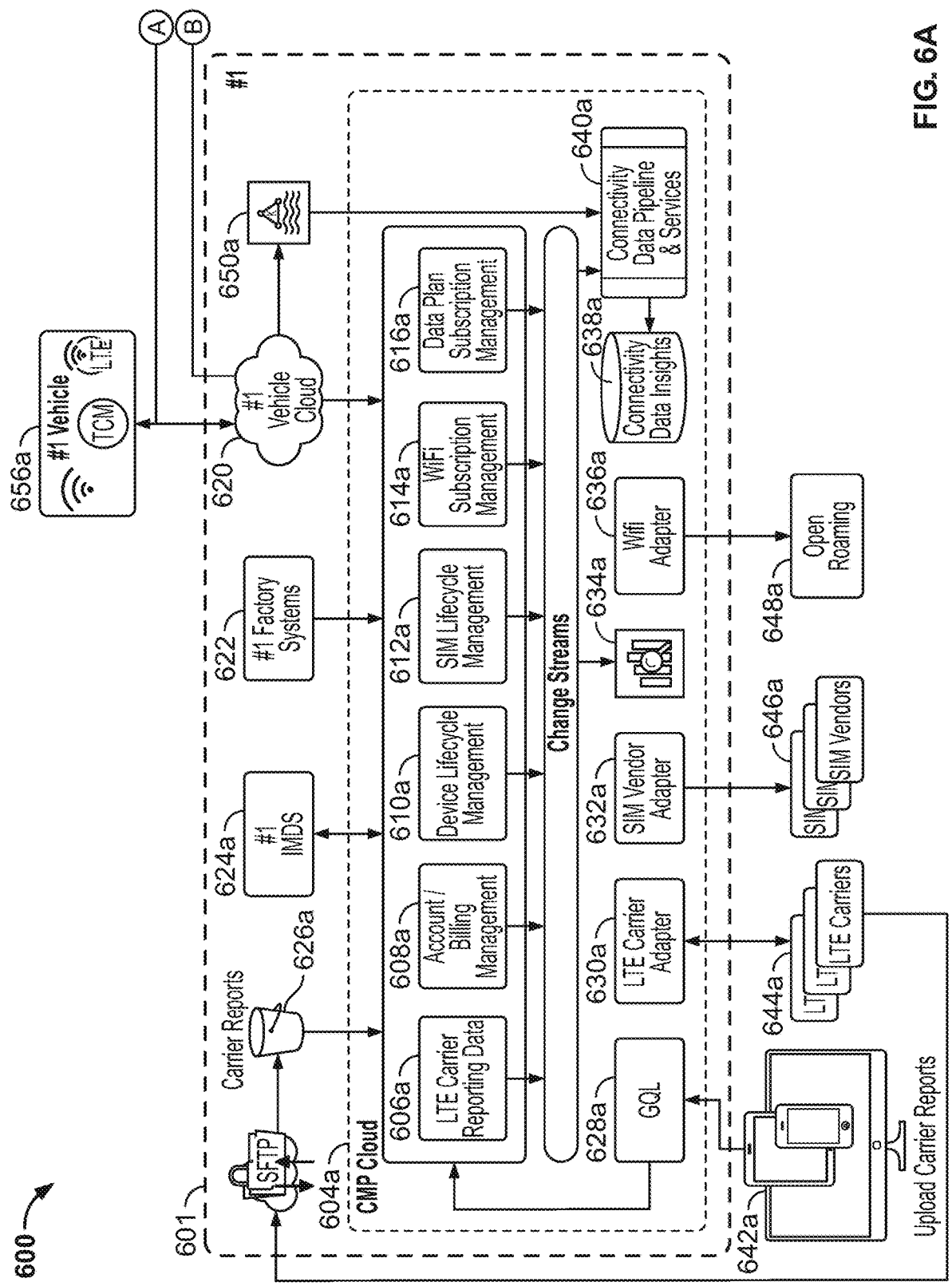
FIGS. 6A and 6B depict an exemplary framework for managing connectivity of devices in a plurality of systems with separate CMPs, in accordance with some embodiments of the present disclosure.
Figure 6B:
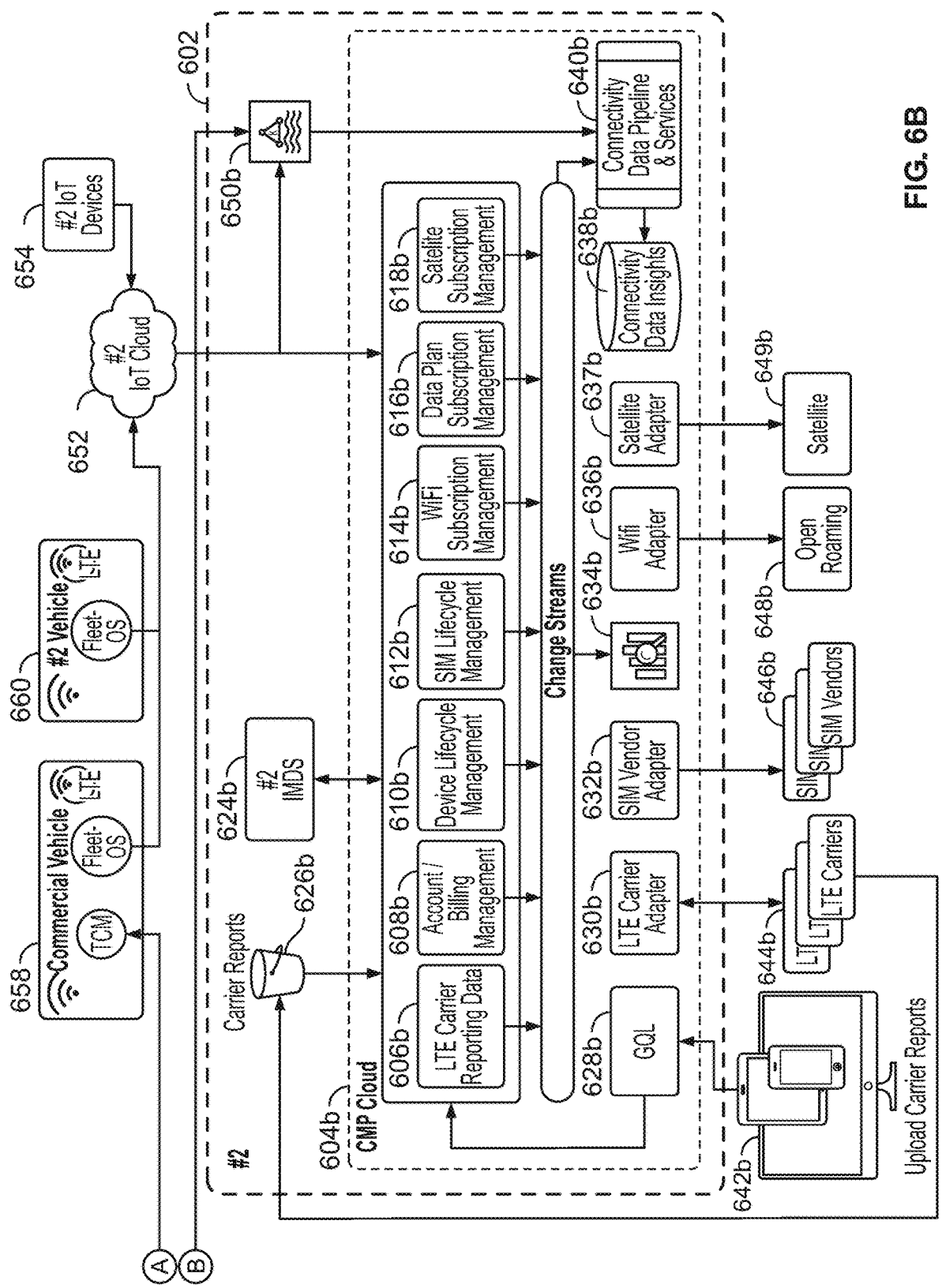

FIGS. 6A and 6B depict an exemplary framework 600 for managing connectivity of devices in a plurality of systems (e.g., system #1 and system #2) with separate CMPs 604a and 604b, in accordance with some embodiments of the present disclosure. As shown, certain devices (e.g., first vehicle 656a) may be associated with system #1 601, other devices (e.g., second vehicle 660 and IoT device 654) may be associated with system #2 602, while other devices (e.g., commercial vehicle 658) may be associated with both systems 601 and 602. In one embodiment, system #1 601 may be a vehicle manufacturer, while system #2 602 may be a vehicle or device operator. However, this is only one example, and the systems may be any device manager.

As shown, system #1 601 includes a first CMP 604a. As shown, the CMP 604a may include LTE carrier reporting data module 606a, account/billing management module 608a, device lifecycle management module 610a, SIM lifecycle management module 612a, Wi-Fi subscription management module 614a, and data plan subscription management module 616a. The CMP 604a may communicate with display devices 642a (e.g., displaying a UI for the single pane of glass), LTE carriers 644a, SIM vendors 646a, and open roaming provider 648a through graph query language (GQL) 628a, LTC carrier adapter module 630a, SIM vendor adapter 632a, and Wi-Fi adapter module 636a. The CMP 604a may also communicate with analytics database 634a, connectivity data insights database 638a, and connectivity data pipeline and services module 640a. Message queue 650a may be in communication with first vehicle cloud 620 and connectivity data insights database 638a.

In some embodiments, reports from LTE carriers 644a may be uploaded to carrier reports via secure file transfer protocol (SFTP) 604a to database 626a, which is accessible by the CMP 604a. As shown, the CMP 604a may also communicate with a first international material data system (IMDS) 624a, factory systems module 622 and the first vehicle cloud 620. The CMP 604a may implement the functions described above and below to manage connectivity for the first vehicle 656a and commercial vehicle 658. Data that is collected and converted in system #1 by the CMP 604a may be presented by the display devices 642a or any other display.

As shown, system #2 602 may include components similar to system #1 601 and is therefore not described again here in detail. For example, system #2 602 includes a second CMP 604b. The CMP 604b may include LTE carrier reporting data module 606b, account/billing management module 608b, device lifecycle management module 610b, SIM lifecycle management module 612b, Wi-Fi subscription management module 614b, data plan subscription management module 616b, and satellite subscription management module 618b. In some embodiments, the CMP 604b may be provided by system #1 601. The CMP 604b may communicate with display devices 642b, LTE carriers 644b, SIM vendors 646b, and open roaming provider 648b through GQL 628b, LTC carrier adapter module 630b, SIM vendor adapter 632b, Wi-Fi adapter module 636b, satellite 649b through satellite adapter 637b. The CMP 604b may also communicate with analytics database 634b, connectivity data insights database 638b, and connectivity data pipeline and services module 640b. Message queue 650b may be in communication with IoT cloud 652 and connectivity data insights database 638b. Data that is collected and converted in system #1 by the CMP 604b may be presented by the display devices 642b or any other display.

In some embodiments, reports from LTE carriers 644b may be uploaded to carrier reports to database 626b, which is accessible by the CMP 604b. As shown, the CMP 604b may also communicate with a second international material data system (IMDS) 624b, and the IoT cloud 652. The CMP 604b may implement the functions described above and below to manage connectivity for the commercial vehicle 658, the second vehicle 660, and the IoT devices 654.

Each of the systems 601 and 602 includes an integrated database management system, which respectively houses a plurality of data relevant to, for example, data usage and eSIM life cycles of the connected devices. As shown, the respective CMPs 604a and 604b may monitor and change streams (e.g., connectivity carriers) based on the aggregated data in the CMP (e.g., which may be converted into a unified data format, as described in further detail below). In some embodiments, either of the CMPs 604a and 604b may be separately implemented on-premise (e.g., hosted by servers of the respective system). In other embodiments, either of the CMPs 604 and 604b may be cloud-based.

Figure 7:
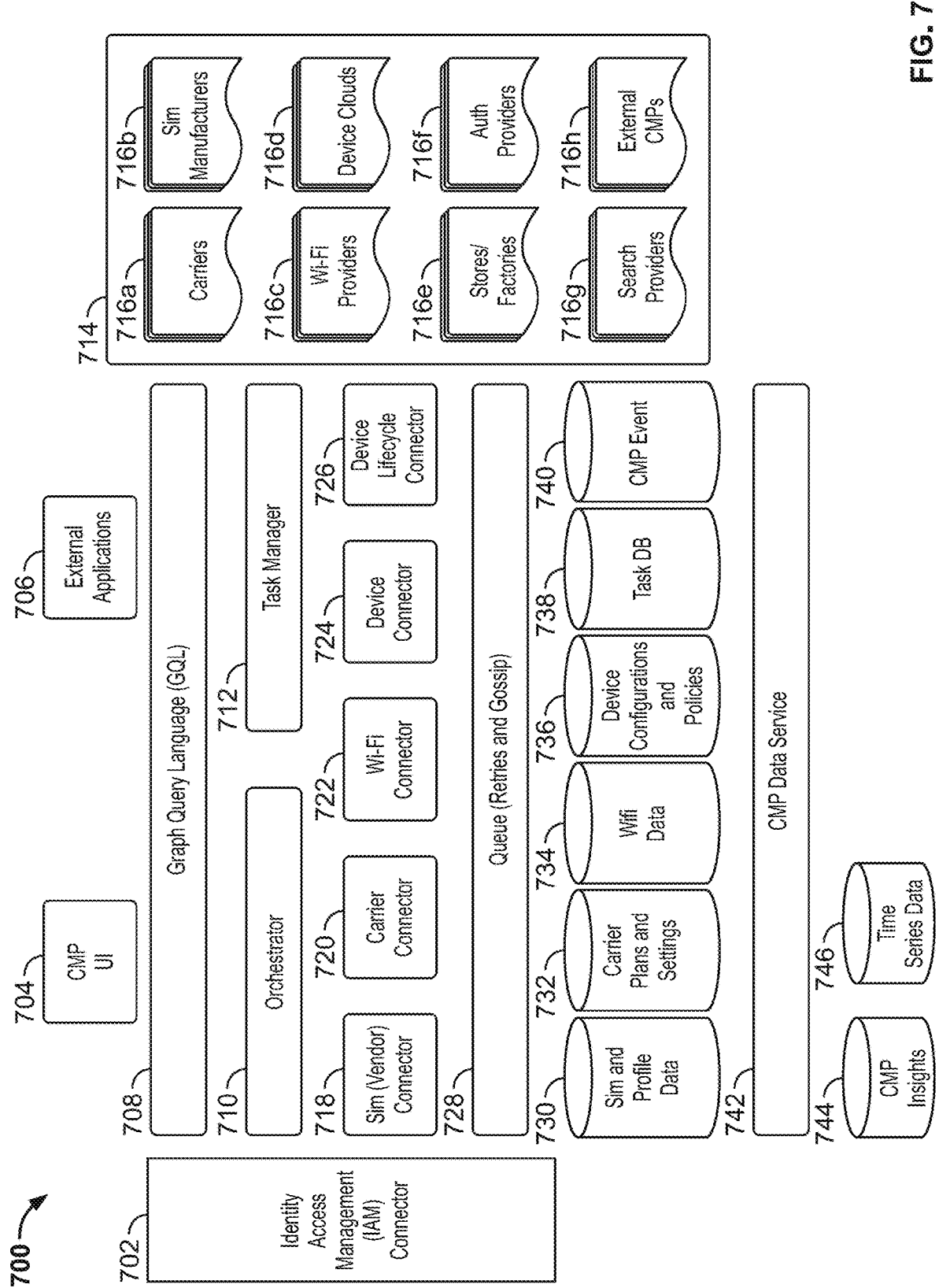
FIG. 7 depicts an exemplary unified data model of a CMP, in accordance with some embodiments of the present disclosure.

FIG. 7 depicts an exemplary unified data model 700 of a CMP, in accordance with some embodiments of the present disclosure. The unified data model 700 (e.g., the unified data model and adapter layer 202 of FIG. 2) acts as a translation layer to communicate with a plurality of networks. In some embodiments, the unified data model 700 may communicate with carriers in their respective languages to develop a data model for the CMP 102 described herein. It will be understood that the unified data model 700 may include an identity management system, which may offer users access to comprehensive data (e.g., data usage, usage trends, etc.) on the plurality of connected devices. For example, as shown, the adapter layer may include dedicated connectors (e.g., identify access management (IAM) connector 702, SIM connector 718, cellular carrier connector 720, Wi-Fi connector 722, device connector 724, and device lifecycle connector 726) for connecting to different data sources/connectivity providers 714 (e.g., carriers 716a, SIM manufacturers 716b, Wi-Fi providers 716c, device clouds 716d, stores/factories 716e, authorization providers 716f, search providers 716g, and external CMPs 716h. Each connector may include an adapter (e.g., API) for mapping and converting data and commands between each respect data format and the unified data format of the unified data model 700.

As shown, the unified data model 700 may further include a graph query language (GQL) module 708, orchestrator module 710, test manager module 712, queue 728, one or more databases (e.g., SIM and profile data database 730, carrier plans and settings database 732, Wi-Fi data database 734, device configurations and policies database 736, task database 738, CMP event database 740, CMP insights database 744, and time series data database 746. Although each of the one or more databases 730-746 is shown as a separate database, it should be understood one or more of the databases may be combined or implemented separately. The unified data model may further include CMP data service module 742, CMP UI module 704, and external applications module 706.

As described above, by converting data into a unified data format, data can be aggregated and analyzed to monitor connectivity across the entire system and develop insights for optimizing connectivity, minimizing costs (e.g., in real or near-real time), and identifying connectivity issues. Further, as the data is in a unified data format, a single pane of glass may be used across a global fleet (e.g., all carriers and all connectivity types) and analytics to be performed may be performed by applying common rules and functions to the converted data. Additionally, because data may be mapped to a vehicle's VIN, data may be analyzed on both aggregated and VIN level (e.g., for a particular vehicle). For example, the connectivity information that is collected and monitored for a particular vehicle may include one or more EIDs, one or more Wi-Fi profiles, one or more satellite profiles, etc. Each EID may have multiple SIM profiles. Each SIM profile may include ICCID, eSIM profile state (e.g., active/inactive), active carrier, active state (e.g., yes/no), SIM state, in session state (e.g., yes/no), IMEI, MSISDN, IMSI, data enabled state (e.g., yes/no and active network type—e.g., 2G, 3G, 4G, 5G), voice enabled (e.g., yes/no), SMS enabled (e.g., yes/no), data/SMS/voice usage, current signal quality, APN configuration (e.g., APN1-enabled/disabled; APN2-enabled/disabled; APN3-enabled/disabled), rate plan, communication (comm) plan, etc. Each Wi-Fi profile may include MAC ID, current strength, security, data usage (e.g., upload/download), last connected SSID information, IP address, etc.

In some embodiments, it may be advantageous for the CMP (e.g., utilizing the unified data model 700) to provide one or more of the following features (e.g., through the single pane of glass): automate the eSIM lifecycle based on the vehicle's lifecycle and trigger carrier APIs to provision, activate, or suspend cellular service (e.g., manually or automatically); automatically update a vehicle's rate plan or roaming configuration through a connectivity carrier's API (e.g., based on the vehicle's lifecycle); provide a global insights dashboard showing connectivity usage and cost across the global fleet spanning all supported carriers and connectivity types, and allow comparisons based on the type of data traffic (ADAS, OTA, telematics, infotainment, map, etc.) and filtering based on vehicle, geographical, and connectivity attributes; aggregate month to date and historical data usage from cellular carriers and Wi-Fi usage; support eSIM diagnostics, including the ability to troubleshoot a connectivity issue and ideally resolve the issue remotely through the connectivity carrier API; prioritize data transfer over cellular or Wi-Fi depending on the data type and the urgency of the data and use historical connectivity data to predict future connectivity quality/when to offload video data; identify anomalies in data usage that may indicate a vehicle issue, or security breach; detect and remotely de-activate service when a vehicle has been shipped to a country where cellular connectivity is not offered (e.g., through the vehicle OEM); view a global fleet of vehicles and their corresponding connectivity data in a single view that comprises all carriers (MNOs or MVNOs) and CMP's that are currently active on the vehicles; view all EIDs and eSIM profiles in inventory or associated with a VIN regardless of the active or bootstrapped carrier, etc. However, it should be understood that the features described above and throughout this description are merely examples, and the CMP (e.g., CMP 102) may provide any other suitable features to monitor and control connectivity across a fleet of vehicles or other IoT devices. The single pane of glass may present any of this data in a unified display.

Figure 8:
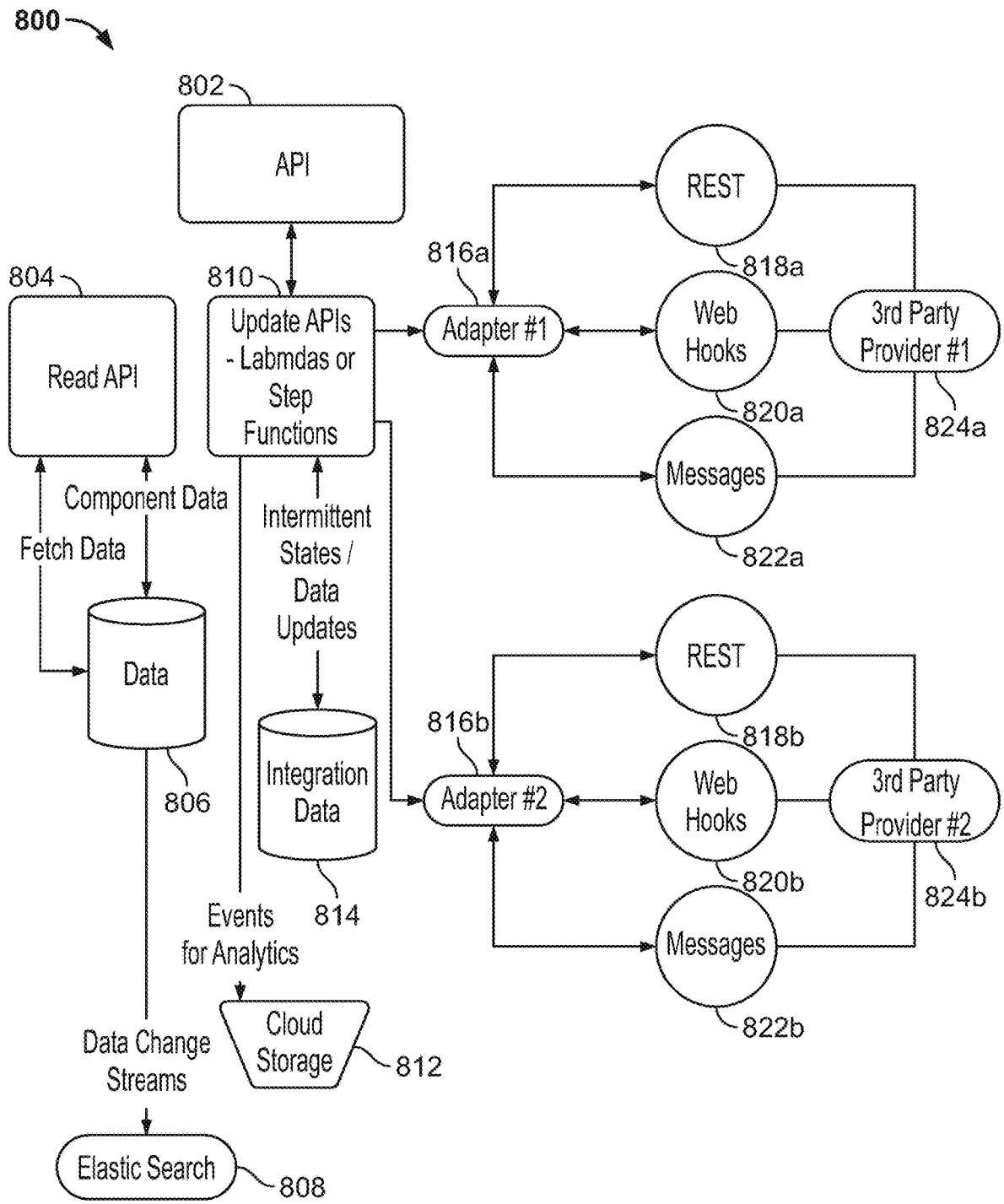
FIG. 8 depicts an illustrative application programming interface (API) flow diagram in accordance with some embodiments of the present disclosure.

FIG. 8 depicts an illustrative API flow diagram 800 in accordance with some embodiments of the present disclosure. Each component part of a CMP (e.g., CMP 102) may include a structure similar to FIG. 8 to scale, read, and update APIs individually, keep integration data and CMP component data separate, add caching to speed up read APIs, and save API or event statistics in cloud storage directly or through a database for future analytics. In some embodiments, if update operations are sparse, API updates can be a group of step functions.

Components of the API flow diagram 800 may be implemented by at least the unified data model and adapter layer 202 of FIG. 2. As shown, the API 802 may communicate (send/receive data and commands) to different third-party providers 824a, 824b (e.g., cellular carriers). For example, adapter 816a may use webhook 820a, REST hook 818a and/or messages 822a to communicate with third-party provider 824a, while adapter 816b may use webhook 820b, REST hook 818b and/or messages 822b communicate with third-party provider 824b. The webhooks 820a, 820b may be data or commands communicated between the adapters 816a, 816b and the third-party providers 824a, 824b. Module 810 may update APIs and implement suitable functions for the API flow diagram 800 and may communicate component data with data database 806 and may communicate intermittent states or data updates with integration data database 814. Cloud storage 812 may receive events for analytics from the module 810, while elastic search module 808 may receive data change streams from data database 806. Read API 804 may fetch data from data database 806. However, it should be understood that the illustrated components of the API flow diagram 800 are simply exemplary and the API flow diagram 800 may include any suitable number and type of components for performing the functions of the API flow diagram 800.

Figure 9:
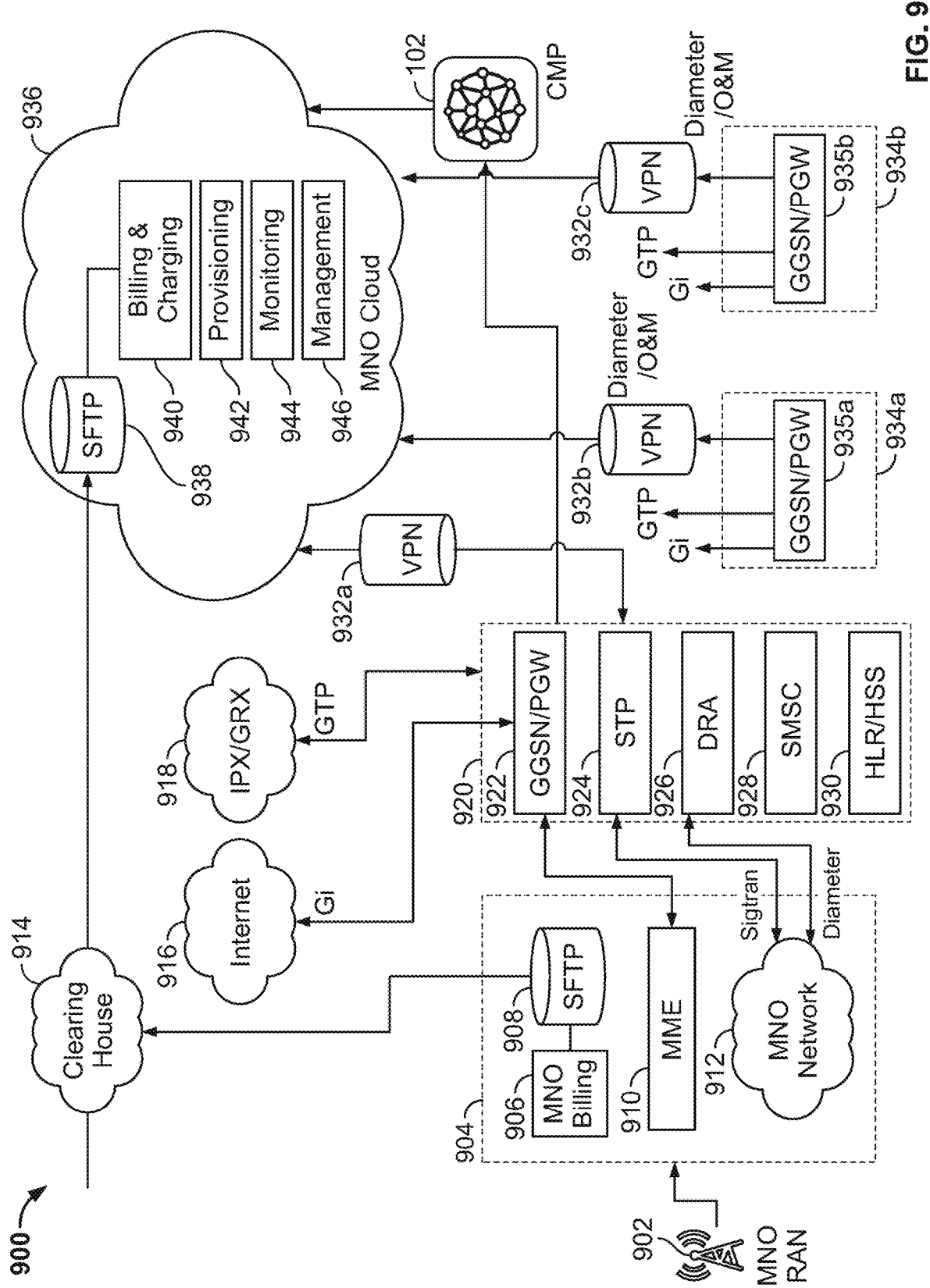
FIG. 9 depicts an exemplary core network, in accordance with some embodiments of the present disclosure.

FIG. 9 depicts an exemplary core network 900, in accordance with some embodiments of the present disclosure. FIG. 9 may be implemented in a CMP (e.g., the CMP 102) to establish a global core network, which, via Wi-Fi, private, cellular, satellite, and open-roaming networks, provides a plurality of devices connectivity no matter their location. In some embodiments, the core network 900 may include cloud storage capability for monitoring, provisioning, and managing the plurality of devices coupled to it. As shown, the core network 900 may include a mobile network operator (MNO) radio access network (RAN) 902 in communication with backend billing system 904 (e.g., implemented by the core network). The backend billing system 904 may include MNO billing module 906, mobile management entity (MME) 910, and MNO network 912, and may implement a secure file transfer protocol (SFTP) 908 for communicating with clearinghouse 914. Core network module 920 may implement a gateway GPRS support node (GGSN)/packet gateway (PGW) 922, signal transfer point (STP) 924, diameter routing agent (DRA) 926, short message service center (SMSC) 928, and home subscriber server/home location register (HSS/HLR) 930. Core network module 920 may communicate through Internet 916 using the Gi interface between GGSN 922 and the Internet, and may communicate with internetwork packet exchange (IPX)/GPRS roaming exchange (GRX) 918 using the GTP interface. Each of the core network module 920, and the first and second cloud resources 934a, 934b may communicate with the Internet 916, IXP/GRX 918 and MNO cloud 936 (e.g., by GSSN/PGW 922, 935a, and 935b). In some embodiments, each of the core network module 920, and the first and second cloud resources 934a, 934b may be connected with MNO cloud 936 (e.g., via virtual private networks (VPNs) 932a, 932b, and 932c). MNO cloud 936 may include SFTP 938, billing and charging module 940, provisioning module 942, monitoring module 944, and management module 946. As shown, the CMP 102 and the clearinghouse 914 may also be connected with MNO cloud 936, and the CMP 102 may communicate with MNOs though the MNO cloud 936.

Figure 10:
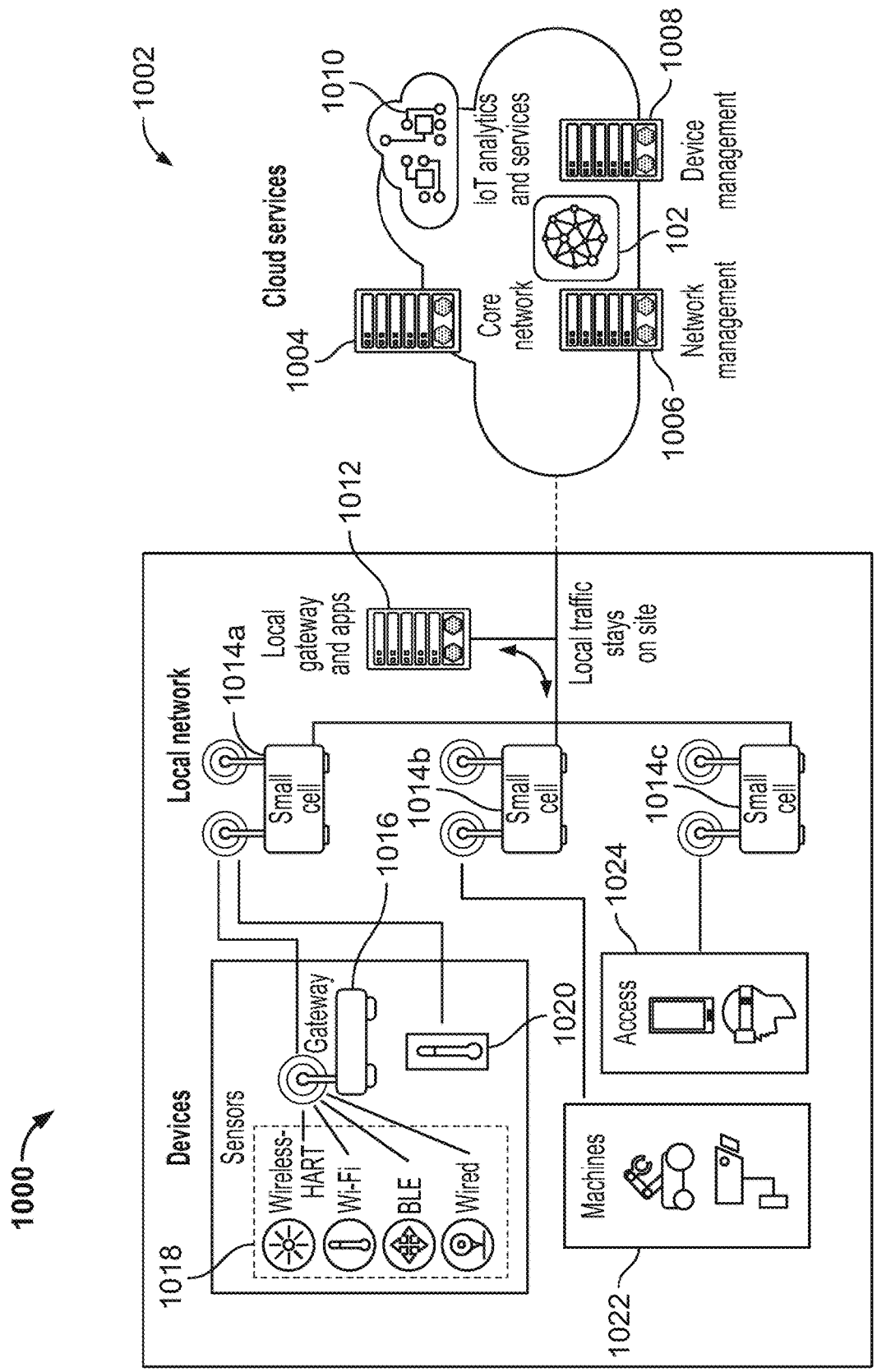
FIG. 10 depicts an exemplary private network architecture, in accordance with some embodiments of the present disclosure.

FIG. 10 depicts an exemplary private network architecture 1000, in accordance with some embodiments of the present disclosure. In some embodiments, the private network may be a private cellular (LTE) network. FIG. 10 includes devices (e.g., sensors 1018, gateway 1016, thermostat 1020, machines 1022, access devices 1024) connected to a local network 1012 via small cells (e.g., low-powered cellular radio access nodes 1014a, 1014b, 1014c), which couple to cloud services 1002 (e.g., including core network 1004, network management server 1006, IoT analytics and services module 1010, and device management module 1008) offered by a connectivity management platform via a local network, which directs data traffic and performs network address translation (NAT). In some embodiments, it may be advantageous to provide a private cellular network within a factory or at charging locations (e.g., to facilitate optimum charging) or at commercial energy storage systems to enable low latency communication. Thus, when vehicles are in range of these private networks, the vehicles may connect to the private networks to upload data and minimize connectivity costs (e.g., compared with other cellular/satellite providers).

Figure 11:
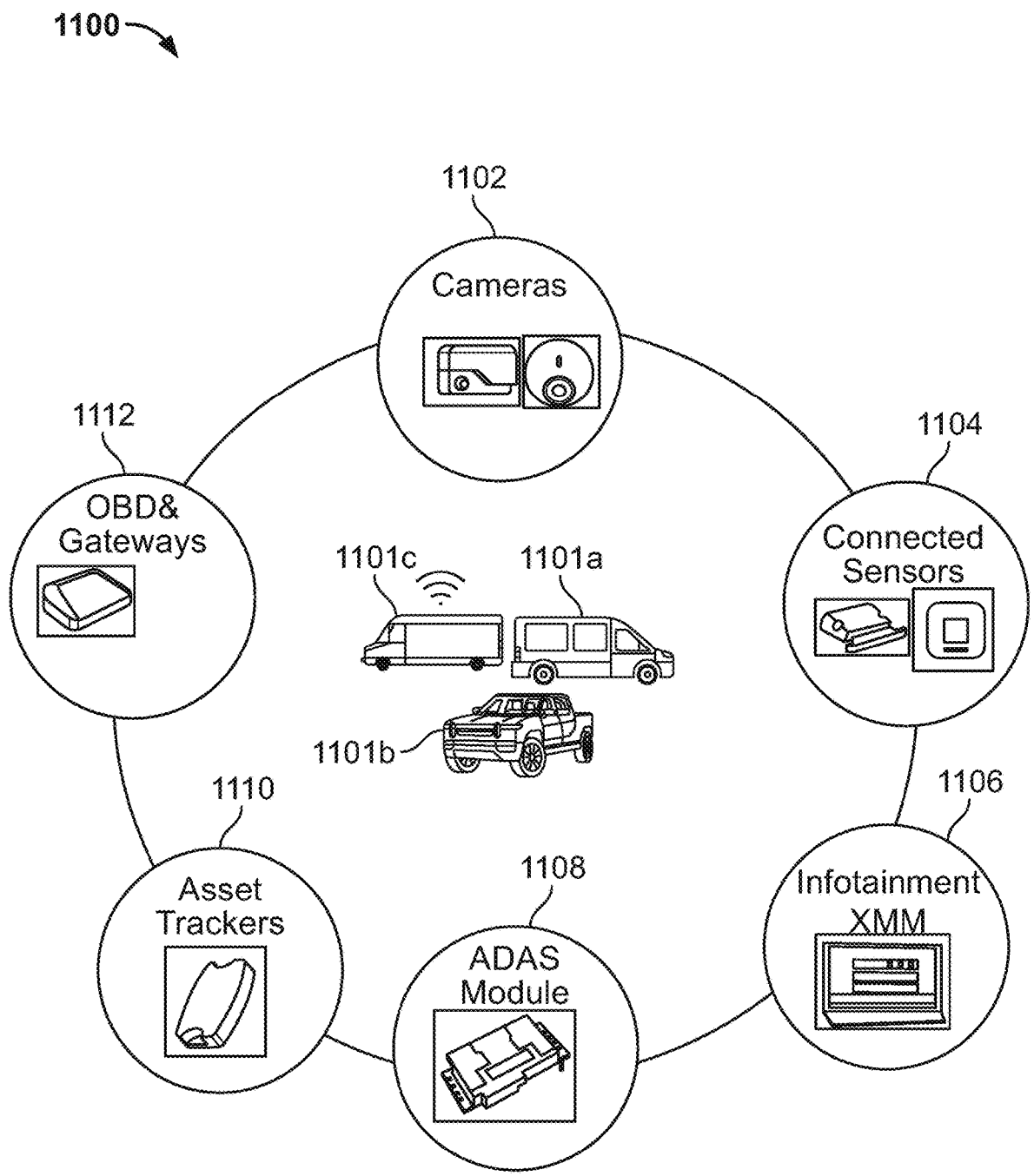
FIG. 11 depicts illustrative fleet hardware, in accordance with some embodiments of the present disclosure.

FIG. 11 depicts illustrative fleet hardware 1100, in accordance with some embodiments of the present disclosure. The devices shown in FIG. 11 allow the connectivity management platform, for example, to monitor and manage commercial fleet vehicles (e.g., 1101a, 1101c) or personal vehicles (e.g., 1101b). In some embodiments, a commercial fleet vehicle may be entering a location where it's necessary to switch carriers in order for the commercial fleet vehicle to sustain robust connectivity, in which case the connectivity management platform may partially identify this via the asset tracker attached to the commercial fleet vehicle. Although FIG. 11 includes six fleet hardware devices, it will be understood that any suitable number (and any suitable type) of fleet hardware devices may be used. For example, as shown, the six fleet hardware devices may include one or more cameras 1102, connected sensors 1104, infotainment experience management module (XXM) 1106, ADAS module 1108, asset trackers 1110, and on-board diagnostics (OBD) gateway 1112 (e.g., OBD2).

Figure 12A:
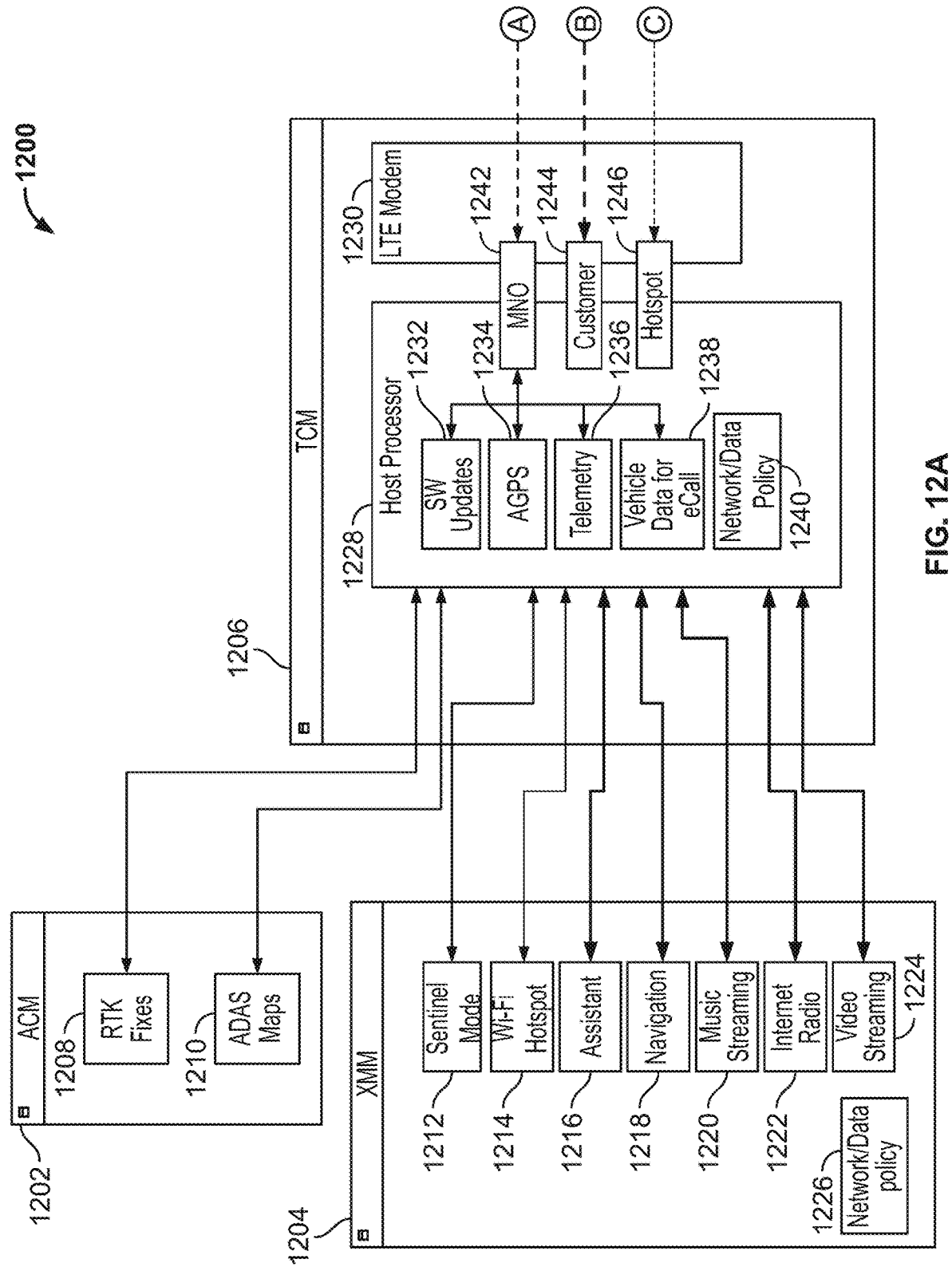
FIGS. 12A and 12B show illustrative vehicle connectivity flow diagrams, in accordance with some embodiments of the present disclosure.
Figure 12B:
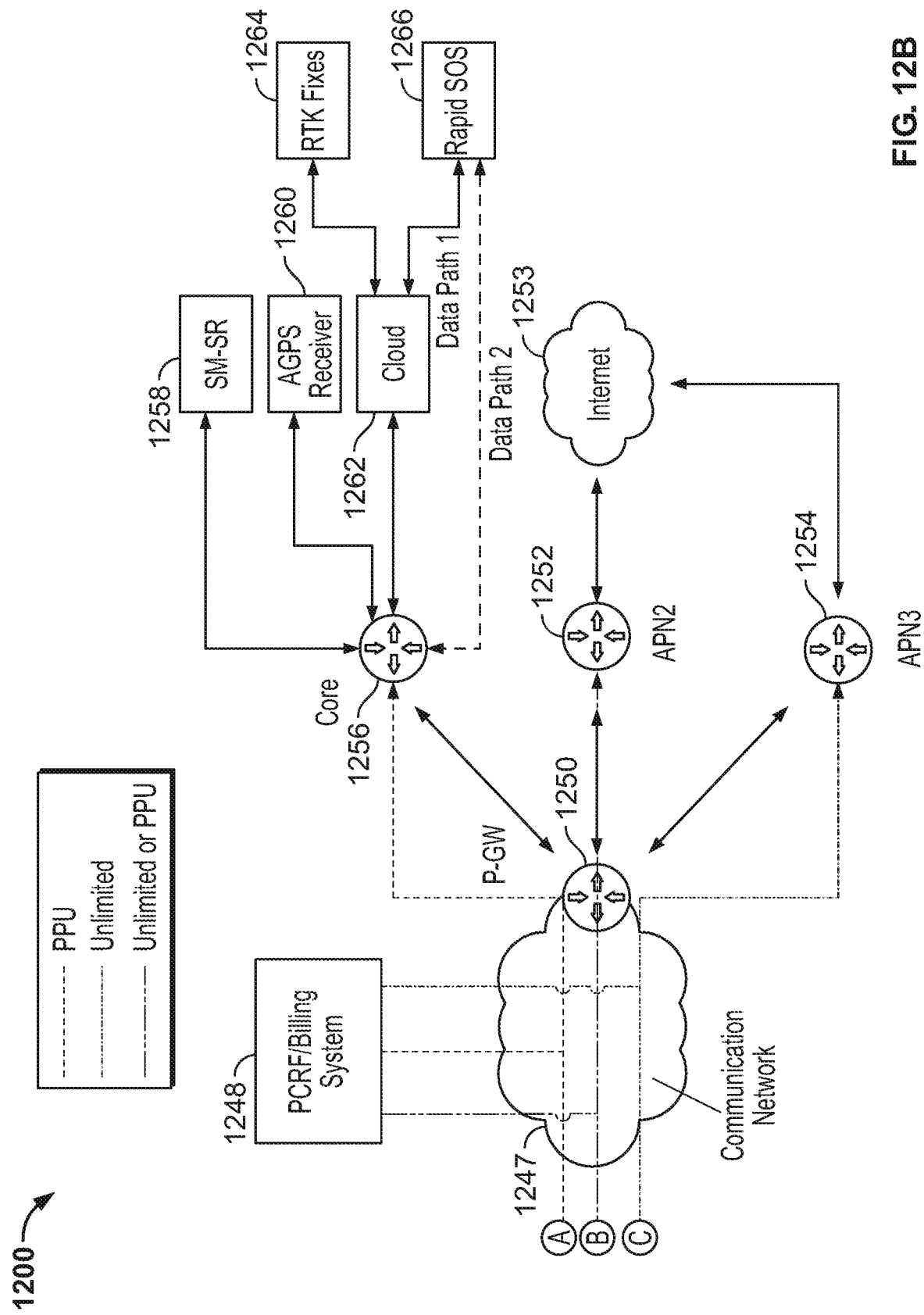

FIGS. 12A and 12B show an illustrative vehicle connectivity flow diagram 1200, in accordance with some embodiments of the present disclosure. For example, FIGS. 12A and 12B show how various modules of a vehicle such as an autonomous control module (ACM) 1202, experience management module (XMM) 1204, and a telematics control module (TCM) 1206 connect with various networks and systems (e.g., via communication network 1247). In some embodiments, the communication network 1247 may be a carrier network. In other embodiments, the communication network 1247 may be any other suitable communication network, such as a Wi-Fi network, satellite network, or open roaming network.

As shown, the ACM 1202 may include real-time kinematic (RTK) fixes module 1208 and advanced driver assistance systems (ADAS) maps module 1210 connected to the TCM 1206. As shown, the XXM 1204 may include sentinel mode module 1212, Wi-Fi hotspot module 1214, assistant module 1216 (e.g., virtual assistant), navigation module 1218, music streaming module 1220, internet radio module 1222, and video streaming module 1224 connected to the TCM 1206. The XXM 1204 may implement a network/data policy 1226.

As shown, the TCM 1206 may include a host processor 1228 and an LTE modem 1230 (e.g., when the communication network 1247 is a carrier network). It should be understood that the TCM 1206 includes other suitable communication modules for connecting with other types of networks (e.g., satellite, Wi-Fi, etc.). As shown, the host processor 1228 may implement SW updates module 1232, assisted GPS (AGPS) module 1234, telemetry module 1236, vehicle data for emergency call (eCall) module 1238, and network/data policy module 1240. As shown, in one embodiment, the TCM 1206 may send and receive information from these modules using MNO 1242. In other embodiments, the TCM 1206 may send and receive information from these modules using customer communication network 1244 or hotspot 1246. As shown, the different types of communications may have different data caps (e.g., unlimited or pay-per-use).

As shown, the TCM 1206 may be connected to policy and charging rules function (PCRF)/billing system 1248 through the communication network 1247. The PCRF/billing system 1248 may support service data flow detection, policy enforcement, flow-based charging, billing, etc.

As shown, the TCM 1206 may be connected to core network 1256, APN2 1252, and APN3 1254 through packet data network gateway (P-GW) 1250. As shown, the core network 1256 may connect the TCM 1206 to SM-SR 1258, AGPS receiver 1260, and RTK fixes module 1264 and Rapid SOS module 1266 through cloud 1262 (or an alternative emergency data path—e.g., "data path 2"), while APN2 and APN3 may connect to the Internet 1253.

Figure 13:
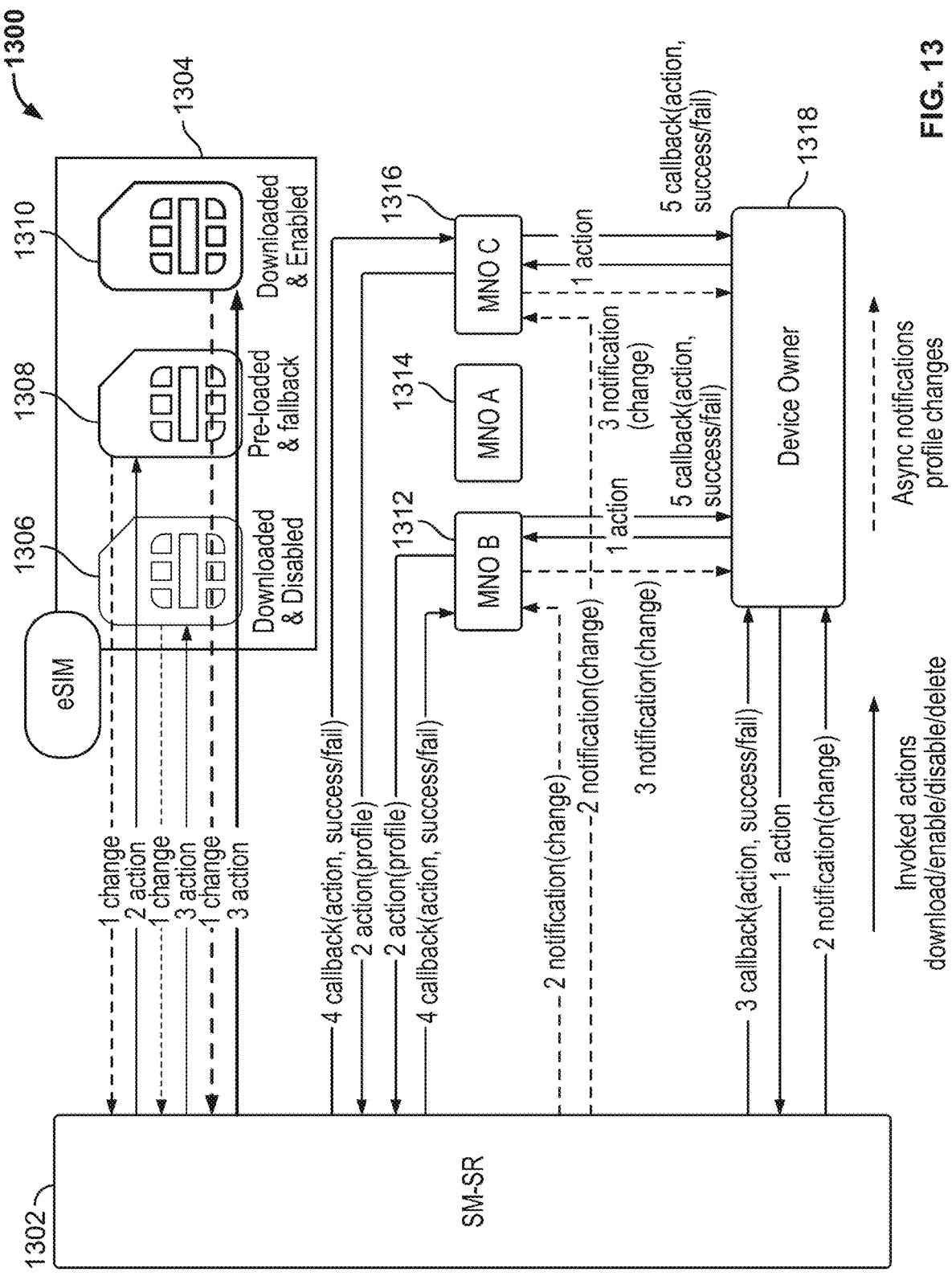
FIG. 13 depicts an eSIM management platform, in accordance with some embodiments of the present disclosure.

FIG. 13 depicts an eSIM management platform 1300, in accordance with some embodiments of the present disclosure. The CMP (e.g., CMP 102), which includes the eSIM management module 206 (e.g., as shown in FIG. 2), may upload carrier software to eSIM 1304 in order to reprogram the eSIM 1304 from one carrier to another. MNOs, which are provided by the respective carriers (e.g., MNO A 1314, MNO B 1312, MNO C 1316), communicate with a device owner 1318 and an SM-SR 1302 (e.g., an adapter to the connectivity management platform) to identify an appropriate carrier to couple to the eSIM 1304 based on certain factors (e.g., location, data usage, lack of coverage, etc.). Once a carrier is identified, the corresponding profile may be enabled in the eSIM 1304. For example, as shown, in response to identifying MNO C 1316 as the current desired carrier, the corresponding profile 1310 is downloaded and enabled in the eSIM 1304 while other downloaded/preloaded profiles (e.g., 1306 and 1308) are disabled. If the currently desired carrier changes, the corresponding profile is enabled and the currently enabled profile is disabled. As shown, various communications and commands (e.g., change profile, callbacks, change notifications, actions, may be communicated between SM-SR 1302, eSIM 1304, and carriers (e.g., 1312, 1314, 1316). For example, the communications may include invoked actions (e.g., to download/enable/disable/delete carrier profiles) and asynchronous notifications (e.g., profile changes).

Figure 14:
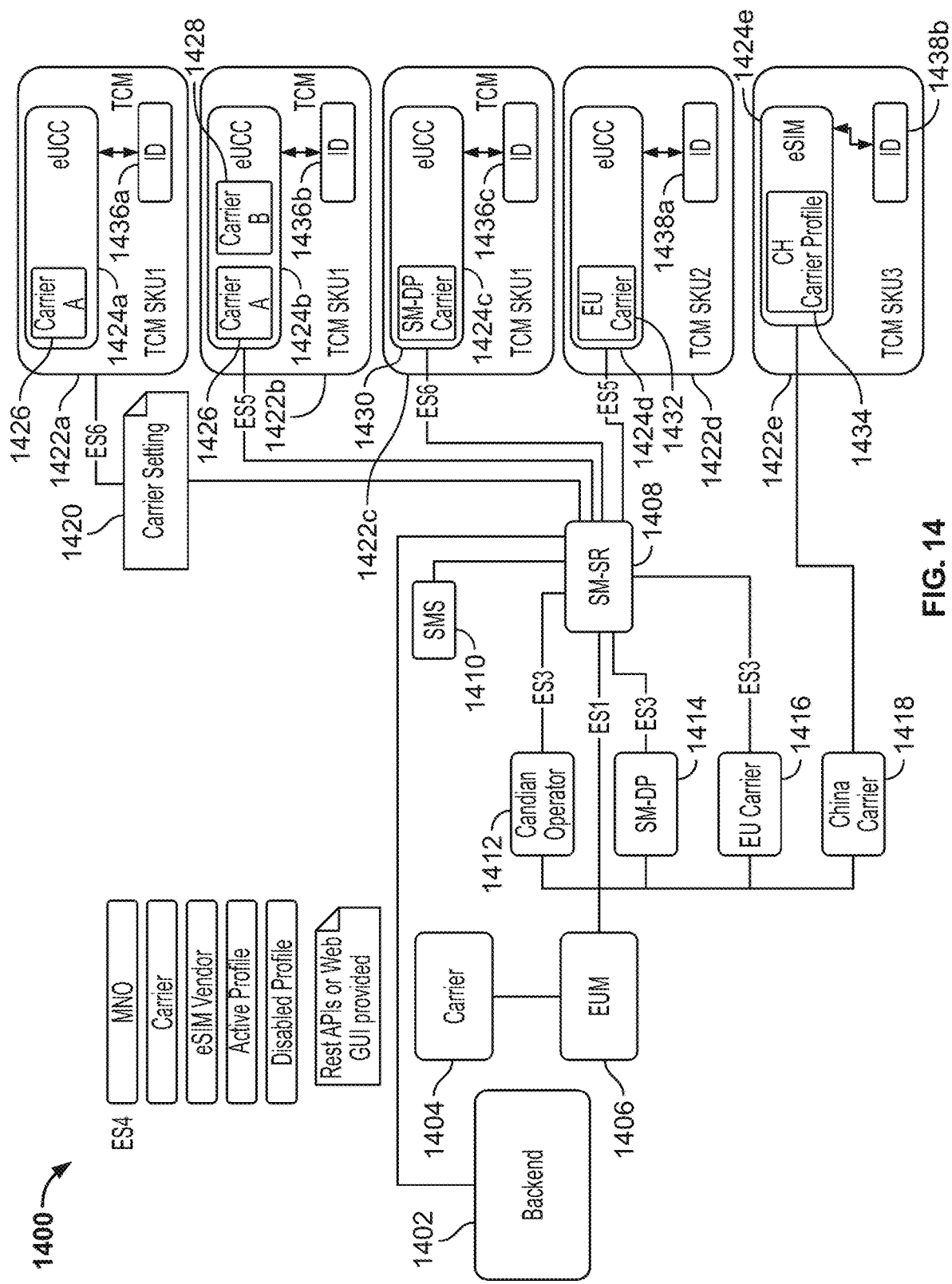
FIG. 14 depicts an illustrative eSIM operations flow diagram, in accordance with some embodiments of the present disclosure.

FIG. 14 depicts an illustrative eSIM operations flow diagram 1400, in accordance with some embodiments of the present disclosure. FIG. 14 shows backend operating systems 1402 coupling to an SM-SR 1408 (e.g., an adapter to the connectivity management platform), which proceeds to program a plurality of eSIMs (e.g., 1422a, 1422b, 1422c, 1422d, 1422e) to respective carriers (e.g., by provisioning the eSIMs with profiles associated with the carrier) to provide them with wireless connectivity. In some embodiments, MNOs, provided by the carriers (e.g., carrier 1404), may integrate with the SM-SR 1408 to identify an appropriate carrier to couple to the eSIM based on certain factors (e.g., location, data usage, lack of coverage, etc.). Different regional-specific carriers (e.g., Canadian operator 1412, SM-DP 1414, EU carrier 1416, China carrier 1418) may be available at different specific locations. The SM-SR 1408 may also be in communication with eUICC manufacturer (EUM) 1406 and SMS 1410.

As shown, each of the plurality of eSIMs 1422 includes eUICC component (e.g., 1424a, 1424b, 1424c, 1424d, 1424d, 1424e) that provides the capability to store the multiple network profiles that can be provisioned and managed over the air (OTA) (e.g., according to carrier setting 1420). For example, as shown, the eSIM 1422a is provisioned with a profile 1426 of carrier A (currently disabled), the eSIM 1422b is provisioned with the profile 1426 (currently disabled) and a profile 1428 of carrier B (currently enabled), the eSIM 1422c is provisioned with a profile 1430 of an SM-DP carrier (currently enabled), the eSIM 1422d is provisioned with a profile 1432 of an EU carrier (currently enabled), and the eSIM 1422*e* may be provisioned with a profile 1434 of a CH carrier (currently enabled). As shown, each eUICC component 1424 is in communication with the respective device IDs (e.g., 1436*a*, 1436*b*, 1436*c*, 1438*d*, 1438*e*). As shown, each eSIM 1422 may be implemented by a TCM of a particular vehicle (e.g., having a unique identifier-SKU). As used herein, "profile" may refer to a combination of a file structure, data and/or applications to be provisioned onto, or present on, an eUICC card, which allows, when enabled, access to a specific network infrastructure (e.g., a mobile network infrastructure).

Figure 15A:
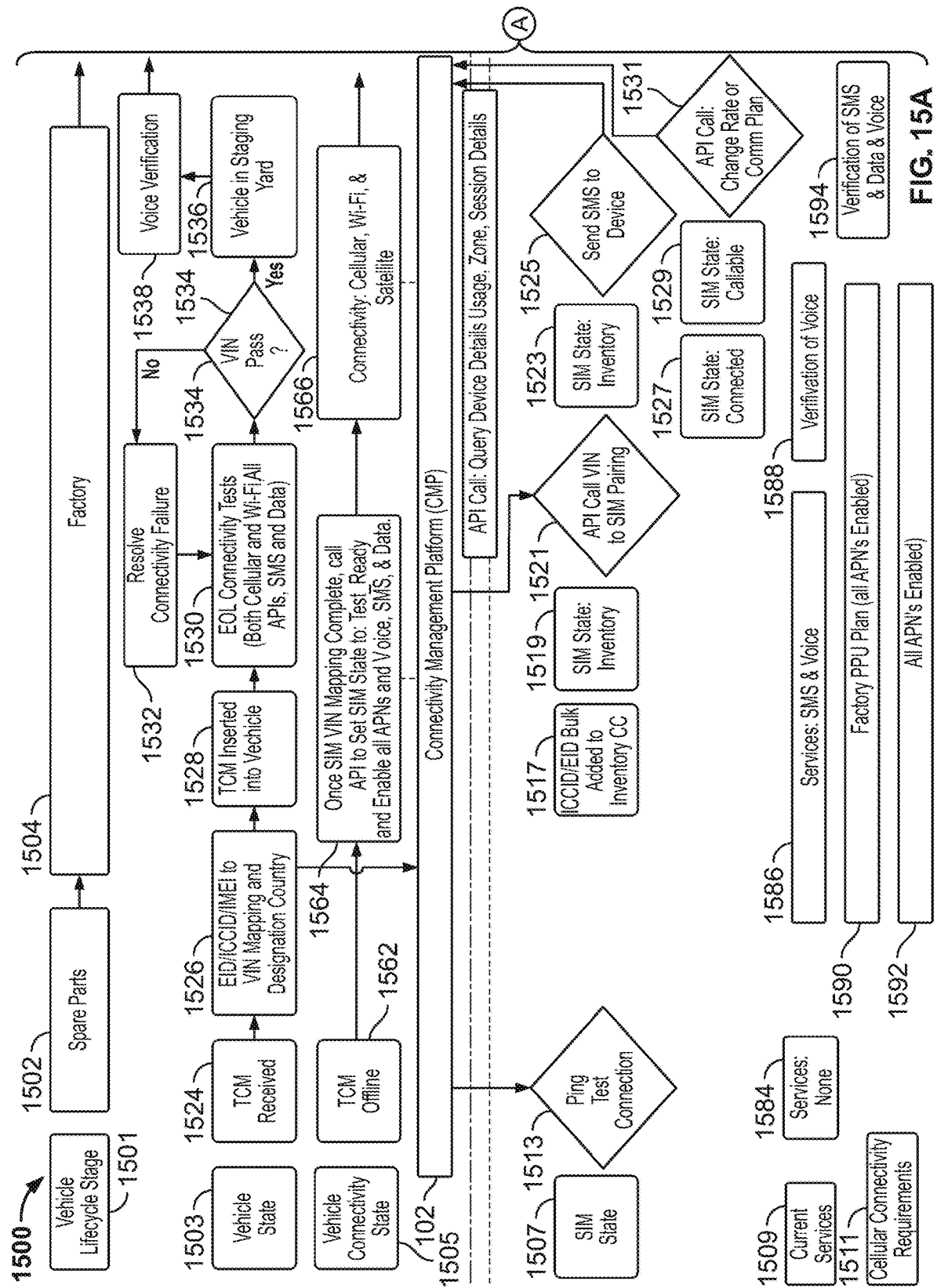
FIGS. 15A-15C depict an illustrative vehicle lifecycle flow diagram and corresponding connectivity states, in accordance with some embodiments of the present disclosure.
Figure 15B:
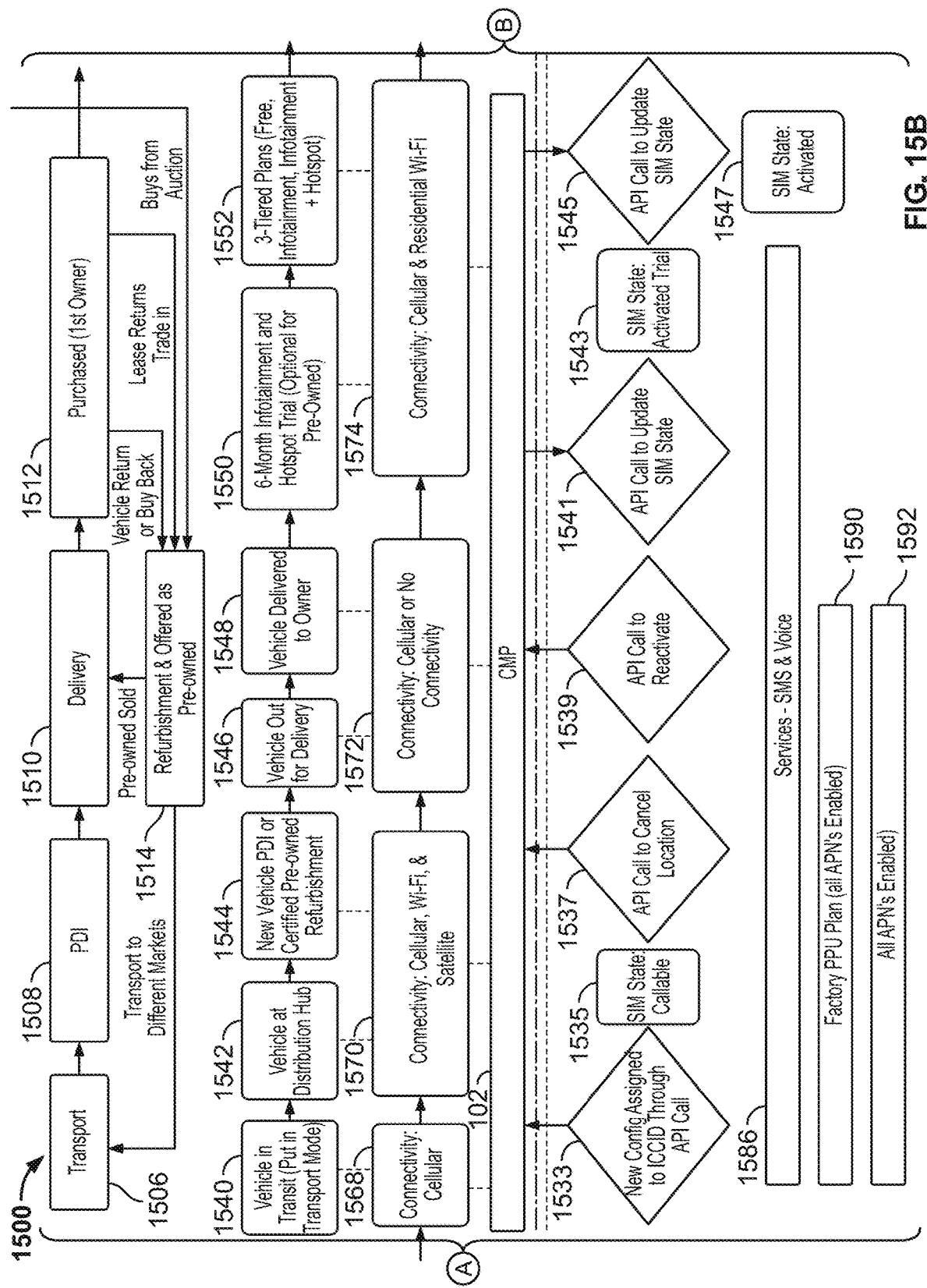
Figure 15C:
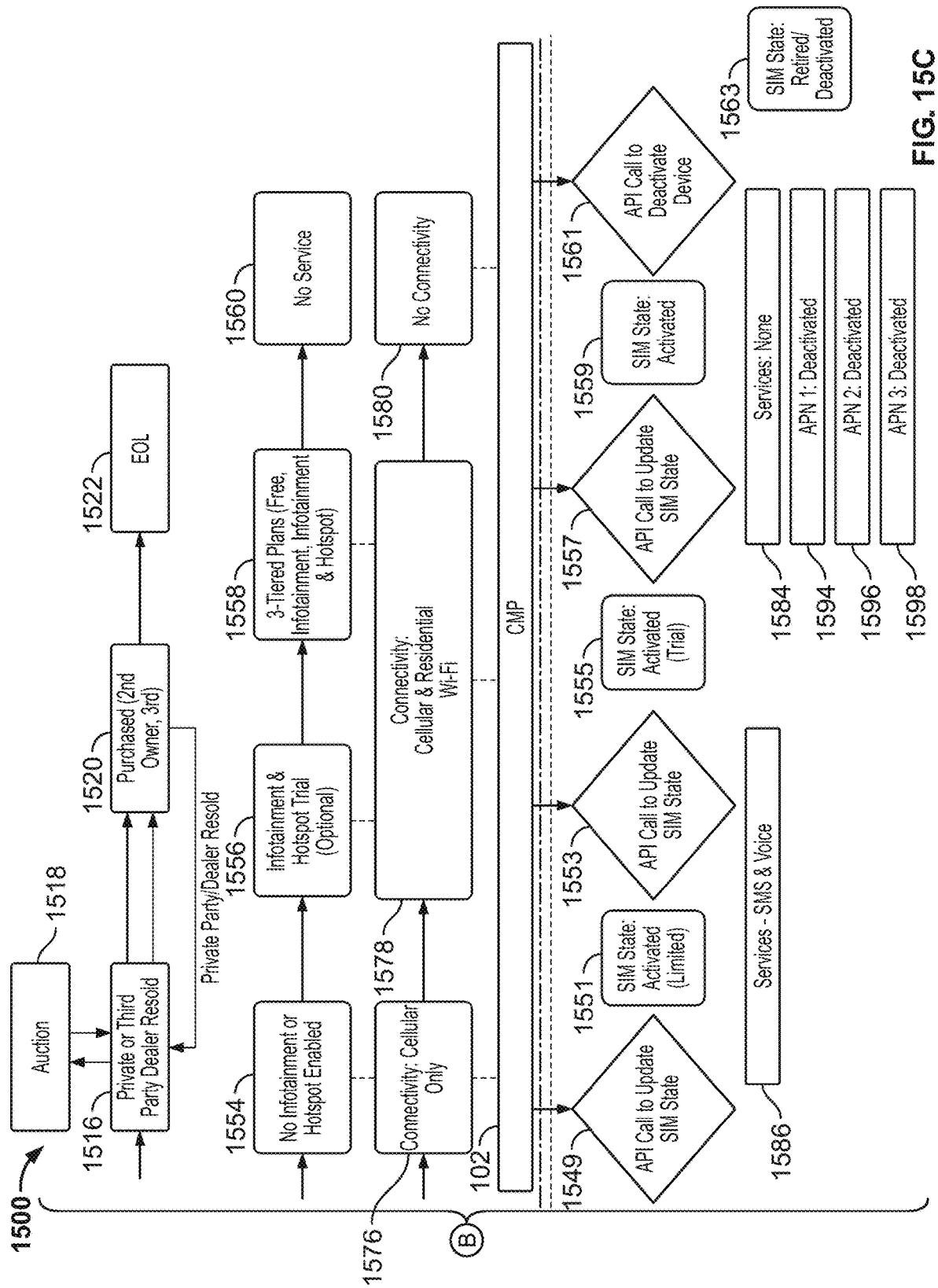

FIGS. 15A-15C depict an illustrative vehicle lifecycle flow diagram 1500 and corresponding connectivity states, in accordance with some embodiments of the present disclosure. For example, as shown, the connectivity of a vehicle may be controlled by API calls from the CMP 102 (e.g., among a plurality of different connectivity types) based on the current lifecycle stage 1501 in a lifecycle of a vehicle and, e.g., a current state 1503 of a vehicle. The vehicle lifecycle flow diagram 1500 illustrates the relationship between the current vehicle lifecycle stage 1501, vehicle state 1503, vehicle connectivity state 1505, SIM state 1507, current services 1509, and cellular connectivity requirements 1511 (e.g., as controlled by the CMP 102). As shown, the current vehicle lifecycle stage 1501 may be determined to be one of spare parts stage 1502, factory stage 1504, transport stage 1506, pre-distribution inspection (PDI) stage 1508, delivery stage 1510, purchased (first owner) stage 1512, refurbishment and offered as pre-owned stage 1514, private or third-party dealer resold stage 1516, auction stage 1518, purchased (second or subsequent owner) stage 1520, end-of-life (EOL) stage 1522. "SIM," as used in the figures, may refer to a SIM or an eSIM. Although a vehicle is described, it should be understood that the illustrative vehicle lifecycle flow diagram 1500 may refer to any suitable connected device lifecycle.

As shown, the current vehicle state 1503 may be determined to be one of TCM received state 1524, EID/ICCID/IMEI to VIN mapping and designation country state 1526, TCM inserted into vehicle state 1528, EOL connectivity tests (both cellular and Wi-Fi, all APIs, SMS and data) state 1530, resolve connectivity failure state 1532, VIN pass state 1534, vehicle in staging yard state 1536, voice verification state 1538, vehicle in transit state 1540, vehicle at distribution hub state 1542, new vehicle PDI or certified pre-owned refurbishment state 1544, vehicle out for delivery state 1546, vehicle delivered to owner state 1548, six-month infotainment and hotspot trial (optional for pre-owned) state 1550, three-tiered plans (free, infotainment, infotainment and hotspot) state 1552, no infotainment or hotspot enabled state 1554, infotainment and hotspot trial (optional) state 1556, and three-tiered plans (free, infotainment, infotainment and hotspot) state 1558, no service state 1560.

The current vehicle lifecycle state 1501 and the current vehicle state 1503 may be determined in a variety of suitable ways, including status updates from factories, part manufacturers, dealers, resellers, etc., scanning of vehicle information at different points (e.g., assembly line, transport, etc.), verification and test results, updates from the vehicle itself, etc.

As shown, the vehicle connectivity state 1505 may be updated by the CMP 102 based on the current vehicle lifecycle state 1501 and the current vehicle state 1503. For example, as shown, the current vehicle connectivity state 1505 may be set to one: of TCM offline state 1562; enable all APNs, voice, SMS and data state 1564 (e.g., once SIM/VIN mapping complete and call API to set SIM state to "test ready and enable all APNs and voice, SMS, and data"); connectivity: cellular, Wi-Fi, and satellite state 1566; connectivity: cellular state 1568; connectivity: cellular, Wi-Fi, and satellite state 1570; connectivity: cellular or no connectivity state 1572; connectivity: cellular and residential Wi-Fi state 1574; connectivity: cellular only state 1576; connectivity: cellular and residential Wi-Fi state 1578; and no connectivity state 1580.

As shown, the current SIM state 1507 may be set via API calls from the CMP 102 based on the current vehicle lifecycle state 1501 and the current vehicle state 1503. For example, the following API calls and corresponding SIM states 1507 may be generated/updated based on the current vehicle lifecycle state 1501 and the current vehicle state 1503 as follows: ping test connection 1513 (e.g., a control center API to pull test connection (verify connectivity to device-device heartbeat)); ICCID/EID bulk added to inventory CC state 1517; SIM state: inventory 1519; API call VIN to SIM pairing 1521; SIM state: inventory 1523; send SMS to device 1525; SIM state: connected 1527; SIM state: callable 1529; API call: change rate or communication (comm) plan 1531, new configuration assigned to ICCID through API call 1533 (e.g., new rate plan, roaming profile, etc.), SIM state: callable 1535; API call to cancel location 1537; API call to reactivate 1539; API call to update SIM state 1541; SIM state: activated trial 1543; API call to update SIM state 1545; SIM state: activated 1547; API call to update SIM state 1549; SIM state: activated (limited) 1551; API call to update SIM state 1553; SIM state: activated (trial) 1555; API call to update SIM state 1557; SIM state: activated 1559; API call to de-activate device 1561; and SIM state: retired/de-activated 1563.

As shown, the current services 1509 may be provided as follows based on the current SIM state 1507: services: none state 1584; services: SMS and voice state 1586; verification of voice state 1588; factory PPU plan (all APNs enabled) state 1590; all APNs enabled state 1592; services: none state 1584; APN 1: de-activated state 1594; APN 2: de-activated state 1596; and APN 3: de-activated state 1598.

As one example, while the vehicle is transported and delivered, the vehicle state is put in a transport mode and a pre-distribution inspection (PDI) is conducted, the connectivity state couples to a cellular network as well as a Wi-Fi network, and the current SIM state 1507 remains activated until it receives an API call to update. As another example, while the vehicle is auctioned or resold to a second/third party, vehicle hotspot capability is disabled. Once the vehicle is resold, hotspot capability is enabled with infotainment capability. In some embodiments, a determination that a vehicle is resold may be made when a new user profile associated with the vehicle is created or when the vehicle is associated with a new user profile.

Figure 16:
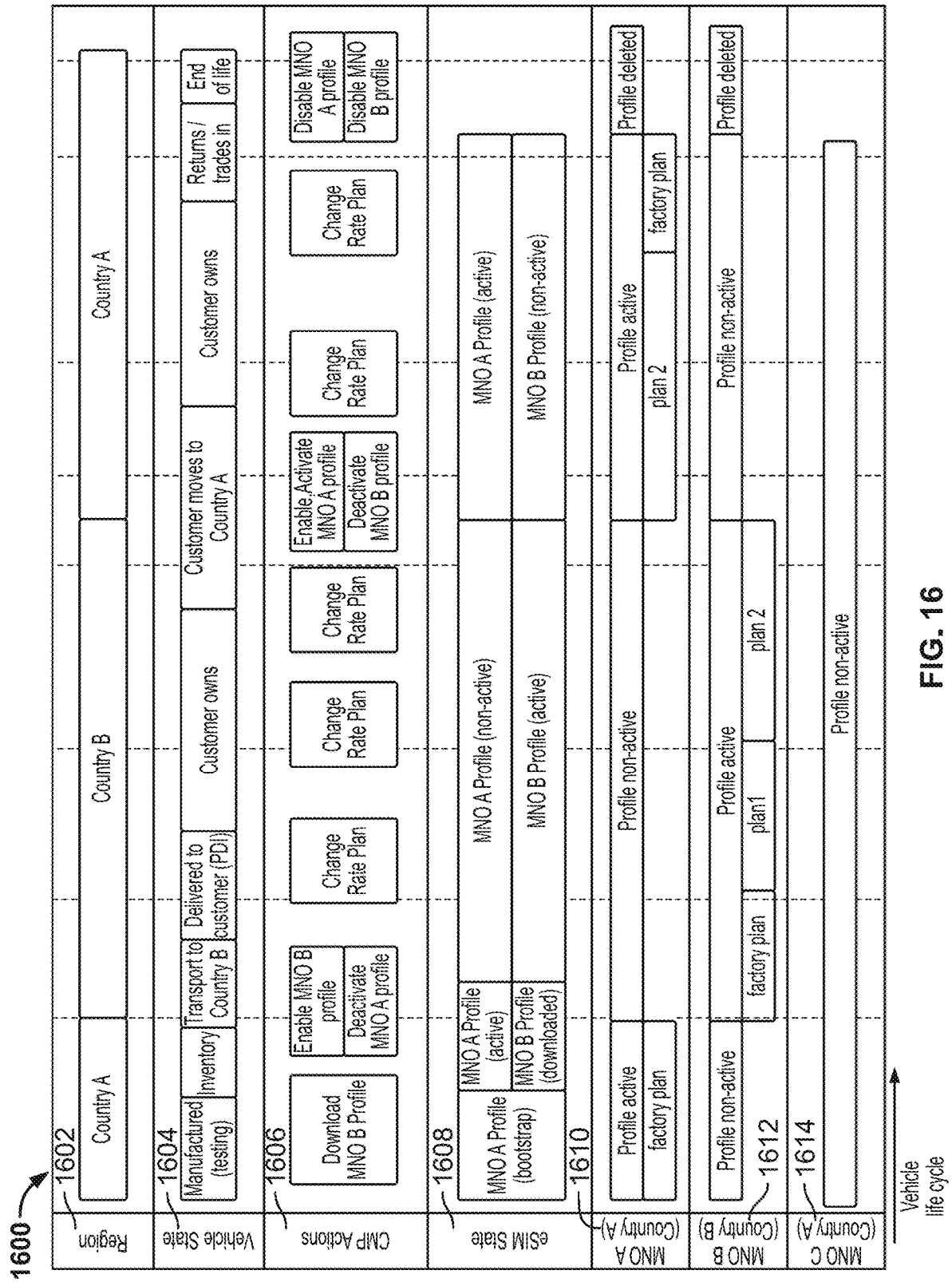
FIG. 16 depicts an illustrative vehicle lifecycle flow diagram and corresponding cellular rate plans and cellular profile states (e.g., active/de-activated), in accordance with a current vehicle state and region (e.g., location)

FIG. 16 depicts an illustrative vehicle lifecycle flow diagram 1600 and corresponding cellular rate plans and cellular profile states (e.g., active/de-activated), in accordance with a current vehicle state and region (e.g., location). For example, FIG. 16 shows the profiles that are active or de-activated on an eSIM of the vehicle and the different cellular rate plans that are selected during the lifecycle of the vehicle. More specifically, as shown, FIG. 16 maps the current region 1602, vehicle state 1604, CMP actions 1606, eSIM state 1608, MNO A (country A) state 1610, MNO B (country B) state 1612, and MNO C (country A) state 1614 throughout the lifecycle and location of the vehicle.

For example, as shown, the current region 1602 (e.g., country A or country B) corresponds to the current location of the vehicle. The current vehicle state 1604 may be one of:

manufactured (testing), inventory, transport to country B, delivered to customer (PDI), customer owns, customer moves to country A, customer owns, returned/traded in, end of life (EOL). Based on the current region 1602 and the current vehicle state 1604, the CMP (e.g., the CMP 102) may perform the corresponding one of a plurality of actions 1606 (e.g., download MNO B profile; enable MNO B profile and de-activate MNO A profile; change rate plan (multiple times), enable/activate MNO A profile and de-activate MNO B profile; change rate plan (multiple); disable MNO A profile and disable MNO B profile. Based on the actions of the CMP 102, the eSIM state 1608 may be set to one of: MNO A profile (bootstrap), MNO A profile (active) and MNO B profile (downloaded); MNO A profile (de-activated), MNO B profile (active); MNO A profile (active), MNO B profile (de-activated).

As shown, the MNO A (country A) 1610 may be one of profile active, factory plan; profile de-activated, profile activated plan 2, activated, factory plan activated, profile deleted. As shown, MNO B (country B) 1612 may be one of profile de-activated, profile active, factory plan, plan 1, plan 2); profile de-activated, profile deleted. In the illustrated example, the CMP 102 does not activate MNO C profile (e.g., based on cost or performance, as described in further detail below.

Figure 17:
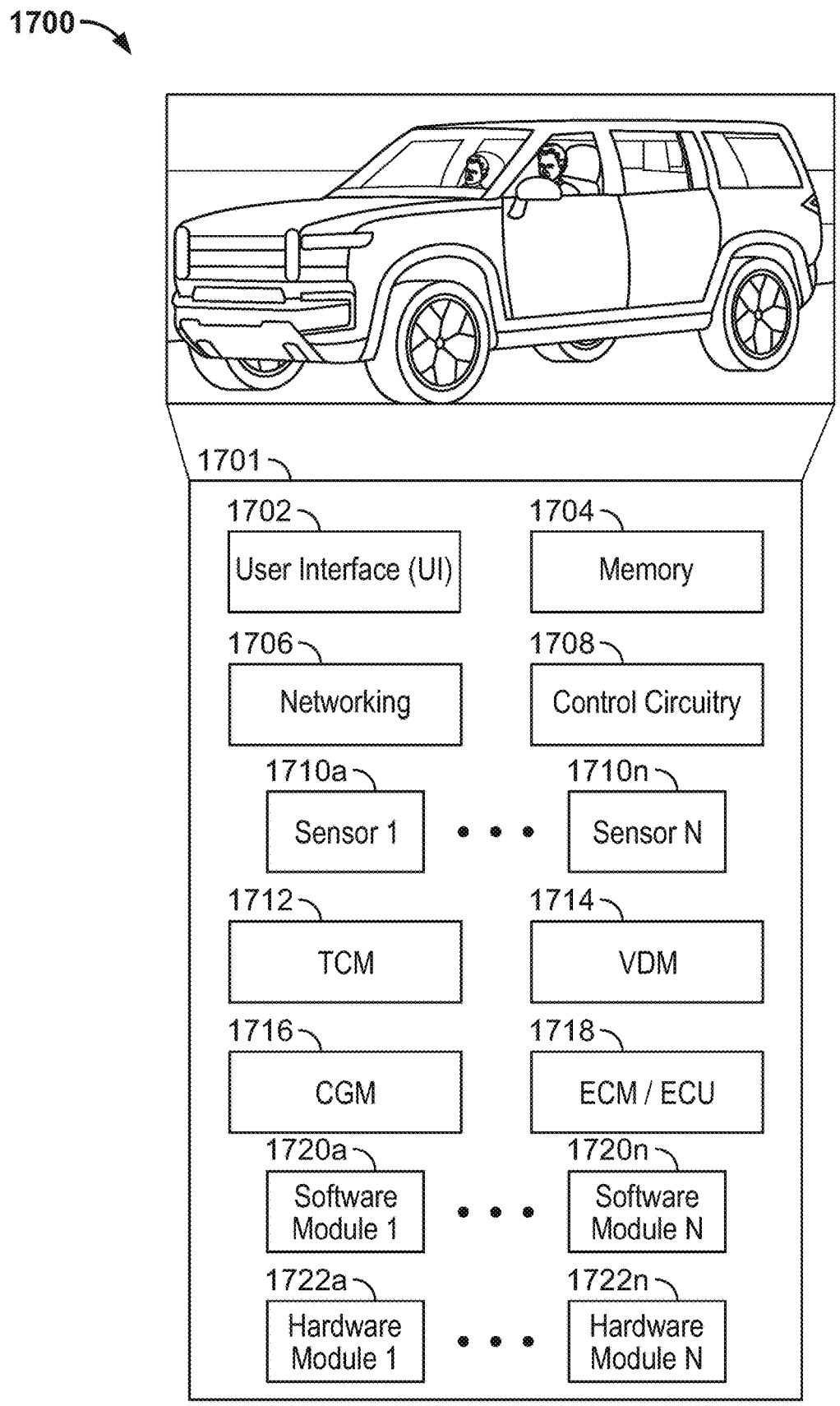
FIG. 17 shows a block diagram of components of a vehicle, in accordance with some embodiments of the present disclosure.

FIG. 17 shows a block diagram 1700 of components of a vehicle 1701, in accordance with some embodiments of the present disclosure. In some embodiments, the vehicle 1701 may comprise any of a variety of suitable systems used for controlling and operating a vehicle. For example, the vehicle 1701 may include user interface (UI) 1702, memory or memories 1704, networking module 1706, control circuitry 1708, a plurality of sensors 1710a-1710n, a TCM 1712, a vehicle dynamics module (VDM) 1714, a central gateway module (CGM) 1716, an ECM/ECU module 1718, a plurality of software modules 1720a-1720n, and a plurality of hardware modules 1722a-1722n. In some embodiments, the control circuitry 1708 may include one or more processors (e.g., a central processor and/or processors dedicated to their subsystems). The control circuitry 1708 may comprise a hardware CPU for executing commands stored in memory or software modules (e.g., 1720a-1720n, 1722a-1722n), or a combination thereof. In some embodiments, the vehicle may include one or more units of transitory memory and/or one or more units of non-transitory memory. In some embodiments, memory may be a part of the vehicle's circuitries. In some embodiments, memory may include hardware elements for non-transitory storage of commands or instructions, that, when executed by the processor, cause the processor to operate the vehicle in accordance with the embodiments described above.

In some embodiments, a control circuitry (e.g., the control circuitry 1708) may be communicatively connected to the sensors 1710a-1710n, to a networking component (e.g., the TCM 1712), and the UI 1702. The sensors may include video sensors, audio sensors, gas sensors, pressure sensors, GPS sensors, radio antennas, video cameras, microphones, pressure sensors, weight sensors, gas sensors, sensors specific to vehicle capabilities any other sensors, or any combination thereof.

In some embodiments, the control circuitry 1708 may use data from sensors to operate the vehicle and/or to perform other functions. In some embodiments, the control circuitry 1708 may receive user input via the UI 1702. In some embodiments, the UI 1702 may include a screen. In some embodiments, the control circuitry 1708 may communicate with a user device and other data sources via a network that may be accessed via a networking component.

In some embodiments, the plurality of software modules 1720a-1720n (e.g., software modules 1-N) may be controlled by the control circuitry 1708. In some embodiments, each of hardware modules 1722a-1722n (e.g., hardware modules 1-N) may be controlled by the control circuitry 1708 or be operated by their own control circuitry. In some embodiments, the vehicle may include circuitries and software specific to the functions or operations of the vehicle. The TCM 1712 may include an eSIM, as described above. In some embodiments, the TCM 1712 is implemented by the networking module 1706. The vehicle may also include any other suitable hardware or software systems.

Figure 18:
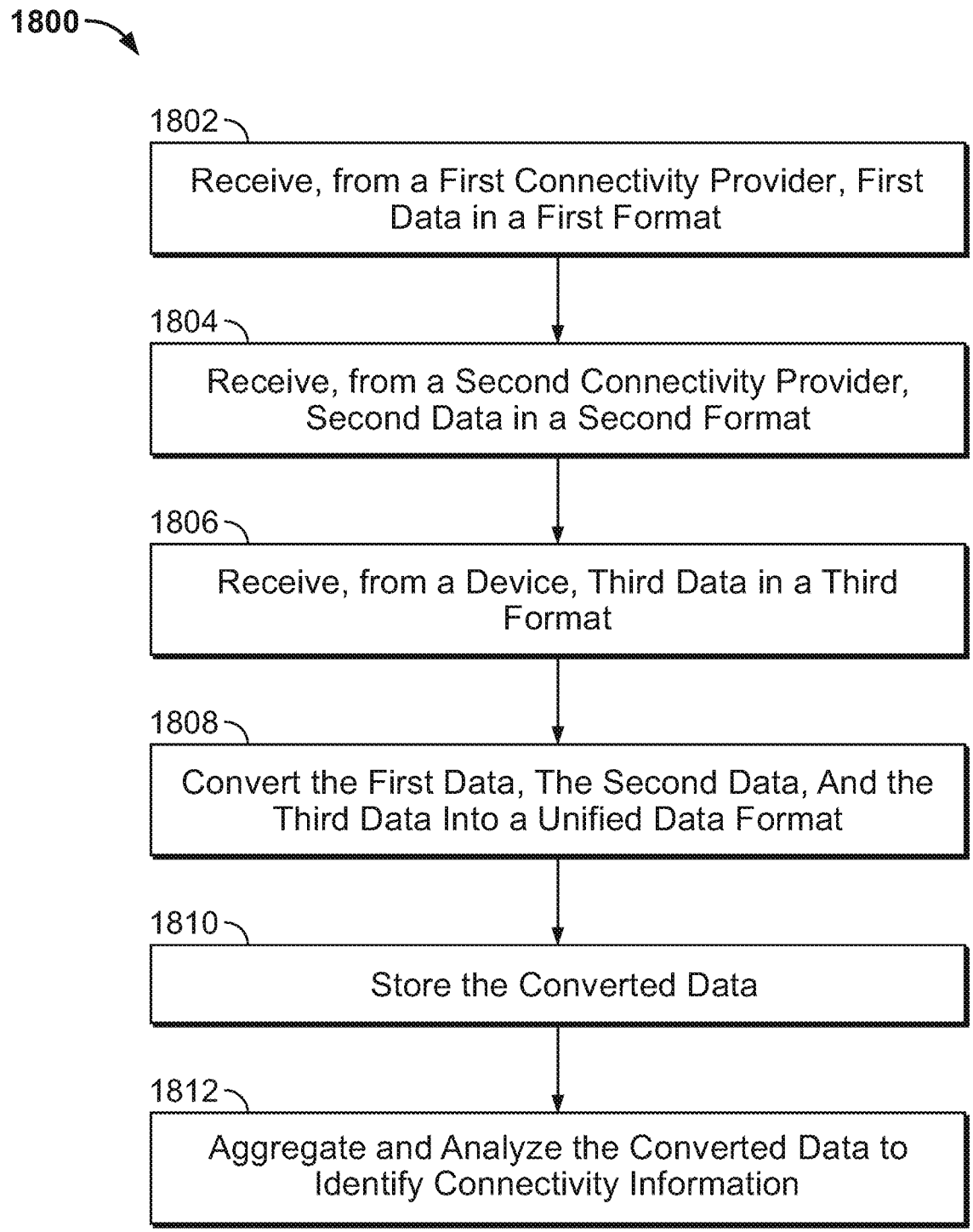
FIG. 18 shows a flowchart of an illustrative process for connectivity management with a unified data format, in accordance with some embodiments of the present disclosure.

FIG. 18 shows a flowchart of illustrative process 1800 for connectivity management with a unified data format, in accordance with some embodiments of the present disclosure. The process 1800 may be performed by the CMP 102 (or any of the other CMPs discussed above) and/or the control circuitry 104 of the CMP 102.

At 1802, the CMP 102 may receive, from a first connectivity provider, first data in a first data format. In some embodiments, the first connectivity provider may be a cellular provider and the first data may include one or more of available plans and settings of the first connectivity provider, first data usage by a device (e.g., a vehicle or IoT device) using a data connection provided by the first connectivity provider, or a current connection state of the device to the first connectivity provider.

At 1804, the CMP 102 may receive, from a second connectivity provider, second data in a second data format. In some embodiments, the second connectivity provider may be another cellular provider and the second data may include one or more of available plans and settings of the second connectivity provider, second data usage by the device using a data connection provided by the second connectivity provider, or a current connection state of the device to the second connectivity provider.

At 1806, the CMP 102 may receive from the device (e.g., a vehicle), third data in a third format. In some embodiments, the third data may include one or more of third data usage by the device, eSIM profiles currently loaded onto an eSIM of the device, or location information of the device.

At 1808, the CMP 102 may convert the first data, the second data, and the third data into a unified data format. For example, the CMP 102 may utilize custom APIs for each data source and data format to convert received data into the unified data format.

At 1810, the CMP 102 may store the converted data in a storage (a data store) (e.g., connectivity data insights database 638a, 638b)

At 1812, the CMP 102 may aggregate and analyze the converted data to monitor connectivity across the entire system and develop insights for optimizing connectivity, minimizing costs (e.g., in real or near-real time), and identifying connectivity issues. For example, the CMP may identify at least one of connectivity usage and cost across a plurality of devices (e.g., a fleet of vehicles or a group of IoT devices), a current connectivity state of each of the plurality of devices, or abnormal data usage of one of the plurality of devices. Additionally, because the data is in a unified data format, a single pane of glass may be implemented to allow data from across all carriers and all connectivity types for a large group or groups of devices (e.g., a fleet of vehicles or IoT devices) to be presented on a unified display.

Figure 19:
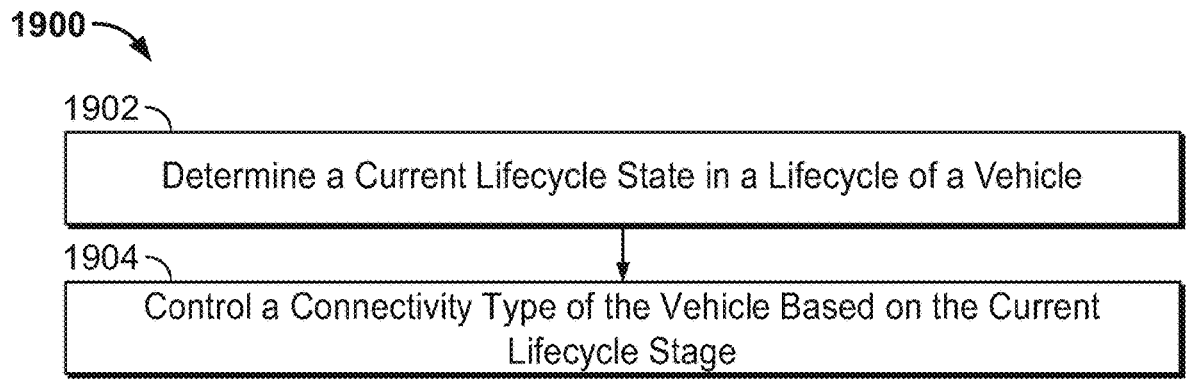
FIG. 19 shows a flowchart of an illustrative process for controlling a connectivity type of a vehicle based on the current lifecycle stage of the vehicle, in accordance with some embodiments of the present disclosure.

FIG. 19 shows a flowchart of illustrative process 1900 for controlling a connectivity type of a vehicle based on the current lifecycle stage of the vehicle, in accordance with some embodiments of the present disclosure. The process 1900 may be performed by the CMP 102 (or any of the other CMPs discussed above) and/or the control circuitry 104 of the CMP 102. At 1902, the CMP 102 may determine a current lifecycle stage in a lifecycle of a vehicle. For example, the current lifecycle stage may be one of the stages described above with reference to FIG. 15 or 16.

At 1904, the CMP 102 may control a connectivity type of the vehicle based on the current lifecycle stage. For example, the CMP 102 may enable or disable one or more of a plurality of connectivity types from among a cellular connectivity, Wi-Fi connectivity, satellite connectivity, or near-field-communication (NFC) connectivity. In some embodiments, the CMP 102 may enable or disable cellular connectivity by provisioning or removing a profile from an embedded eSIM of the vehicle, or enabling or disabling a current profile on the eSIM. In some embodiments, the CMP 102 may further control the connectivity type based on the current location of the vehicle (e.g., and the available connections at that location). In one example, the CMP 102 may enable cellular connectivity and Wi-Fi connectivity of the vehicle in response to determining that the current lifecycle stage is a factory stage and that mapping of an eSIM to the VIN of the vehicle is complete. In another example, the CMP 102 may enable cellular connectivity and disable Wi-Fi connectivity of the vehicle in response to determining that the current lifecycle stage is a delivery stage. In another example, the CMP 102 may enable cellular connectivity and Wi-Fi connectivity and activate a cellular hotspot capability of the vehicle, in response to determining that the current lifecycle stage is a purchased stage. In another example, the CMP 102 may disable all connectivity types of the vehicle at an end-of life state.

Figure 20:
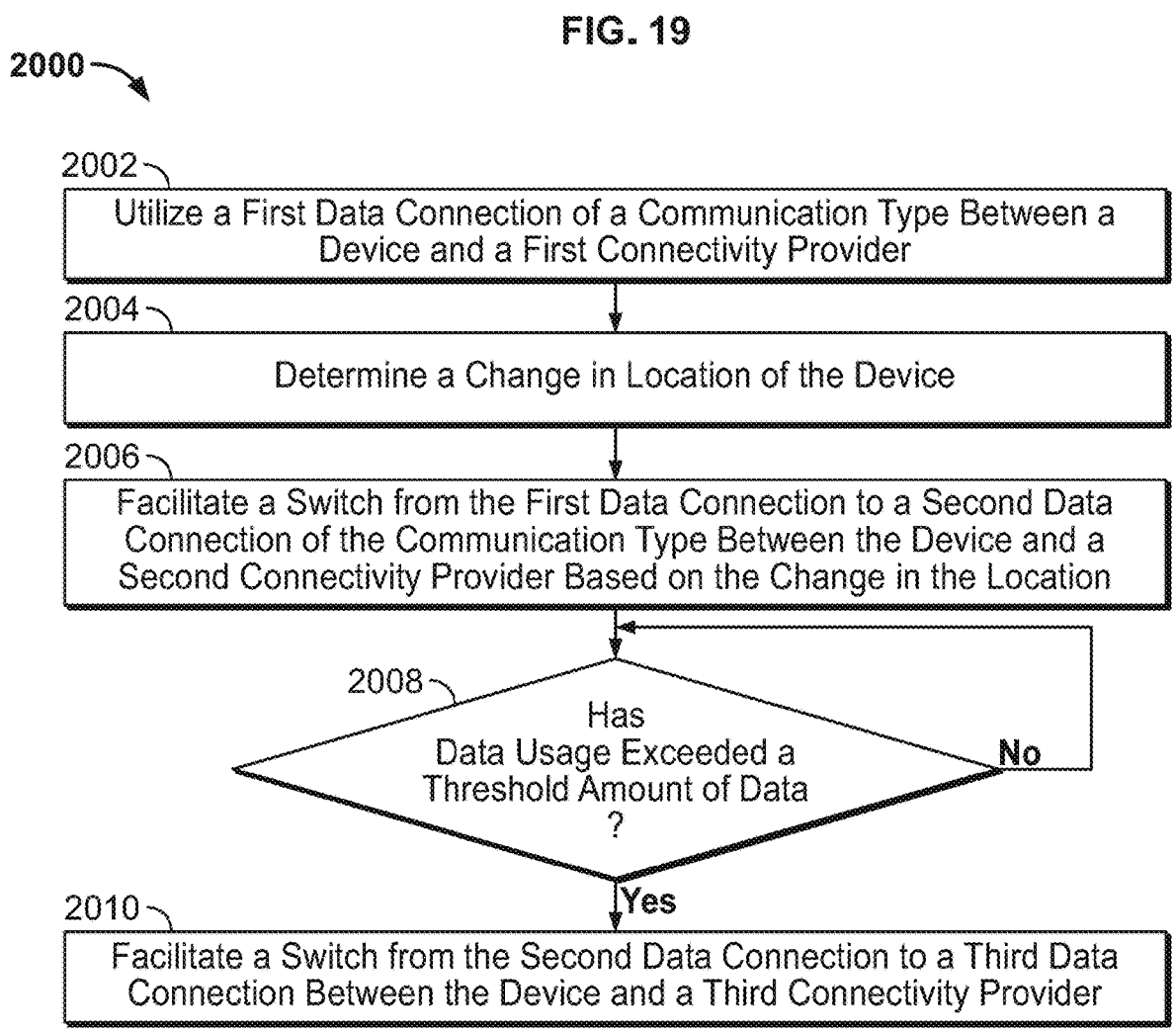
FIG. 20 shows a flowchart of an illustrative process for location-based connectivity switching, in accordance with some embodiments of the present disclosure.

FIG. 20 shows a flowchart of illustrative process 2000 for location-based connectivity switching, in accordance with some embodiments of the present disclosure. The process 2000 may be performed by the CMP 102 (or any of the other CMPs discussed above) and/or the control circuitry 104 of the CMP 102 and any of the devices discussed above (e.g., the device 112).

At 2002, the device 112 (e.g., a vehicle) may utilize a first data connection of a communication type between the device and a first connectivity provider. In some embodiments, the first connectivity provider may be a cellular or satellite provider.

At 2004, the CMP 102 may determine a change in location of the device. In some embodiments, the device 112 may provide its current location to the CMP 102, and the CMP 102 may determine if the current location has changed by more than a predetermined distance from the previously provided location. In some embodiments, the CMP 102 may determine if the device has crossed a predetermined boundary of a region (e.g., different locations may be geofenced). In some embodiments, the CMP 102 may employ different criteria (e.g., the amount of change in location, crossing a predetermined boundary, entering/leaving a region around a charger, entering/leaving a region associated with a private network) to determine if there has been a change in location of the device that is significant enough to make the determination of whether or not to facilitate a connectivity change. In some embodiments, the CMP 102 may predict a change in location or connectivity ability based on an input destination into the navigation system of the vehicle or based on historical routing information (e.g., fleet delivery driver path) that triggers a switch in the connectivity provider (e.g., based on a current route or trip).

At 2006, the CMP 102 may facilitate a switch from the first data connection to a second data connection of the communication type between the device and a second connectivity provider based on the change in the location. In some embodiments, the first data connection is also available at the changed location (e.g., so either of the first or the second connectivity provider could provide a data connection to the device 112). In some embodiments, the second connectivity provider may be a second cellular provider. In this case, facilitating the switch to the second data connection may include: downloading to the device, by the first data connection provided by the first connectivity provider, a profile associated with the second cellular provider; provisioning an eSIM of the device with the profile associated with the second cellular provider; and enabling, on the eSIM, the profile associated with the second cellular provider. In the case that the first connectivity provider is a first cellular provider, the CMP 102 may also control the eSIM to disable a profile associated with the first cellular provider. In some embodiments, if a Wi-Fi connection becomes available, the CMP 102 may control to facilitate a switch to the Wi-Fi connection. In some embodiments, the CMP 102 may determine (e.g., based on historical information) whether to control to facilitate switches between connectivity providers based on the costs and/or performance of the connectivity providers at the changed locations. For example, in some embodiments, the CMP 102 may maintain a connectivity database that tracks costs and/or performance of the connectivity providers at different locations. Based on this information, the CMP 102 may make informed connectivity decisions. As one example, if the CMP 102 determines that the performance of a certain connectivity provider has generally been poor in a certain location (e.g., slow data speeds, intermittent connection) or that another connectivity provider has more optimal connectivity in a region associated with the device or vehicle, the CMP 102 may proactivity facilitate switching to a different connectivity provider at this location. As another example, if the CMP 102 determines that the performance of different connectivity providers has generally been similar at a certain location, but that one of the connectivity providers is cheaper than the other connectivity providers, the CMP 102 may facilitate switching to the cheaper connectivity provider at this location.

At 2008, the CMP 102 may monitor data usage of the device using the second data connection to determine if the data usage exceeds a threshold amount of data (e.g., an amount of data allowed by a current plan before throttling or a price increase).

At 2010, in response to determining that data usage has exceeded a threshold amount of data ("Yes" at step 2008), the CMP 102 may facilitate a switch from the second data connection to another data connection provided by a different connectivity provider (e.g., a third connectivity provider). For example, the CMP 102 may monitor data usage to minimize costs and/or maximize performance, even in the case where the device is not moved.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, in some embodiments, step 1806 may be omitted from the process 1800, and steps 2008 and 2010 may be omitted from the process 2000. In other embodiments, steps 2008 and 2010 may be performed independent from the other steps in the process 1800 (e.g., even when the location of the device has not changed).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method for controlling connectivity of a vehicle, comprising:
   determining, using control circuitry, a current lifecycle stage among a plurality of lifecycle stages in a lifecycle of the vehicle, wherein each lifecycle stage of the plurality of lifecycle stages has a corresponding enabled or disabled state for each of a plurality of connectivity types associated with the vehicle; and
   enabling or disabling, using the control circuitry, one or more of the plurality of connectivity types based on the current lifecycle stage.

2. The method of claim 1, wherein the current lifecycle stage is one of: a parts stage when parts of the vehicle are being manufactured, a factory stage when the vehicle is being assembled, a delivery stage when the vehicle is being delivered to a customer or point of sale, a purchased stage when the customer takes possession of the vehicle, a resale stage when the vehicle is being resold to a second customer, a repurchased stage when the second customer takes possession of the vehicle, a maintenance stage when maintenance is being performed on the vehicle, or an end-of-life stage of the vehicle.

3. The method of claim 1, wherein the plurality of connectivity types comprising a cellular connectivity, Wi-Fi connectivity, satellite connectivity, or near-field-communication (NFC) connectivity.

4. The method of claim 1, wherein enabling or disabling one or more of the plurality of connectivity types comprises provisioning or removing a profile from an embedded subscriber identity module (eSIM) of the vehicle, or enabling or disabling a current profile on the eSIM.

5. The method of claim 1, wherein enabling or disabling one or more of the plurality of connectivity types is further based on a current location of the vehicle.

6. The method of claim 1, wherein determining the current lifecycle stage comprises receiving information from a telematics control module (TCM) of the vehicle.

7. The method of claim 1, further comprising:
   in response to determining that the current lifecycle stage is a factory stage, determining whether mapping of an embedded subscriber identity module (eSIM) to a vehicle identification number (VIN) of the vehicle is complete; and
   in response to determining that the mapping of the eSIM to the VIN of the vehicle is complete, enabling cellular connectivity and Wi-Fi connectivity of the vehicle.

8. The method of claim 1, further comprising:
   in response to determining that the current lifecycle stage is a delivery stage, enabling cellular connectivity and disabling Wi-Fi connectivity of the vehicle.

9. The method of claim 1, further comprising:
   in response to determining that the current lifecycle stage is a purchased stage, enabling cellular connectivity and Wi-Fi connectivity of the vehicle, and activating a cellular hotspot capability of the vehicle.

10. The method of claim 1, further comprising:
    in response to determining that the current lifecycle stage is an end-of-life stage, disabling all of the plurality of connectivity types associated with the vehicle.

11. A system, comprising:
    a memory storing instructions; and
    control circuitry configured to execute the instructions stored in the memory to:
       determine a current lifecycle stage among a plurality of lifecycle stages in a lifecycle of a vehicle, wherein each lifecycle stage of the plurality of lifecycle stages has a corresponding enabled or disabled state for each of a plurality of connectivity types associated with the vehicle; and
       enable or disable one or more of the plurality of connectivity types based on the current lifecycle stage.

12. The system of claim 11, wherein the current lifecycle stage is one of: a parts stage when parts of the vehicle are being manufactured, a factory stage when the vehicle is being assembled, a delivery stage when the vehicle is being delivered to a customer or point of sale, a purchased stage when the customer takes possession of the vehicle, a resale stage when the vehicle is being resold to a second customer, a repurchased stage when the second customer takes possession of the vehicle, a maintenance stage when maintenance is being performed on the vehicle, or an end-of-life stage of the vehicle.

13. The system of claim 11, wherein the plurality of connectivity types comprising a cellular connectivity, Wi-Fi connectivity, satellite connectivity, or near-field-communication (NFC) connectivity.

14. The system of claim 11, wherein the control circuitry is configured to enable or disable one or more of the plurality of connectivity types by provisioning or removing a profile from an embedded subscriber identity module (eSIM) of the vehicle, or enabling or disabling a current profile on the eSIM.

15. The system of claim 11, wherein the control circuitry configured to enable or disable one or more of the plurality of connectivity types further based on a current location of the vehicle.

16. The system of claim 11, wherein the control circuitry is configured to determine the current lifecycle stage by receiving information from a telematics control module (TCM) of the vehicle.

17. The system of claim 11, wherein the control circuitry is further configured to two or more of:
    in response to determining that the current lifecycle stage is a factory stage, determine whether mapping of an embedded subscriber identity module (eSIM) to a vehicle identification number (VIN) of the vehicle is complete and, in response to determining that the mapping of the eSIM to the VIN of the vehicle is complete, enable cellular connectivity and Wi-Fi connectivity of the vehicle;
    in response to determining that the current lifecycle stage is a delivery stage, enable the cellular connectivity and disable the Wi-Fi connectivity of the vehicle;
    in response to determining that the current lifecycle stage is a purchased stage, enable the cellular connectivity and Wi-Fi connectivity of the vehicle, and activate a cellular hotspot capability of the vehicle; or in response to determining that the current lifecycle stage is an end-of-life stage, disable all of the plurality of connectivity types associated with the vehicle.

18. A non-transitory computer-readable medium having non-transitory computer-readable instructions encoded thereon that, when executed by control circuitry, cause the control circuitry to:
determine a current lifecycle stage among a plurality of lifecycle stages in a lifecycle of a vehicle, wherein each lifecycle stage of the plurality of lifecycle stages has a corresponding enabled or disabled state for each of a plurality of connectivity types associated with the vehicle; and
enable or disable one or more of the plurality of connectivity types based on the current lifecycle stage.

19. The non-transitory computer-readable medium of claim 18, wherein the current lifecycle stage is one of: a parts stage when parts of the vehicle are being manufactured, a factory stage when the vehicle is being assembled, a delivery stage when the vehicle is being delivered to a customer or point of sale, a purchased stage when the customer takes possession of the vehicle, a resale stage when the vehicle is being resold to a second customer, a repurchased stage when the second customer takes possession of the vehicle, a maintenance stage when maintenance is being performed on the vehicle, or an end-of-life stage of the vehicle.

20. The non-transitory computer-readable medium of claim 18, wherein execution of the instructions to enable or disable one or more of the plurality of connectivity types further causes the control circuitry to provision or remove a profile from an embedded subscriber identity module (eSIM) of the vehicle, or enable or disable a current profile on the eSIM.

* * * * *